US012707363B2

(12) United States Patent
Haustein et al.

(10) Patent No.: US 12,707,363 B2
(45) Date of Patent: Aug. 11, 2026

(54) INTEGRATED ACCESS AND BACKHAUL NODE

(71) Applicant: Fraunhofer-Gesellschaft zur Foerderung der angewandten Forschung e.V., Munich (DE)

(72) Inventors: Thomas Haustein, Berlin (DE); Roya Ebrahim Rezagah, Berlin (DE); Thomas Wirth, Berlin (DE); Jasmina Mcmenamy, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 240 days.

(21) Appl. No.: 18/477,393

(22) Filed: Sep. 28, 2023

(65) Prior Publication Data

US 2024/0040463 A1 Feb. 1, 2024

Related U.S. Application Data

(63) Continuation of application No. PCT/EP2022/058658, filed on Mar. 31, 2022.

(30) Foreign Application Priority Data

Apr. 1, 2021 (EP) .................................... 21166621

(51) Int. Cl.
*H04W 36/30* (2009.01)
*H04W 36/00* (2009.01)
(Continued)

(52) U.S. Cl.
CPC ....... *H04W 36/30* (2013.01); *H04W 36/0058* (2018.08); *H04W 48/20* (2013.01); *H04W 88/085* (2013.01)

(58) Field of Classification Search
CPC . H04W 36/30; H04W 36/0058; H04W 48/20; H04W 88/085; H04W 36/0009;
(Continued)

(56) References Cited

U.S. PATENT DOCUMENTS

2015/0257092 A1* 9/2015 Zhao .................. H04W 36/304 455/452.2
2020/0154336 A1* 5/2020 Islam ...................... H04L 45/22
(Continued)

FOREIGN PATENT DOCUMENTS

EP 3280179 A1 2/2018
WO 2014071561 A1 5/2014
(Continued)

OTHER PUBLICATIONS

3GPP TR 36.806 Relay architectures for E-UTRA (LTE-Advanced), V9.0.0 Technical Specification Group Radio Access Network; Evolved Universal Terrestrial Radio Access (E-UTRA); Relay architectures for E-UTRA (LTE-Advanced), (Release 9), 2010 (34 pages).
(Continued)

*Primary Examiner* — Mohamed A Kamara
(74) *Attorney, Agent, or Firm* — Ashurst Perkins Coie; Michael A. Glenn

(57) ABSTRACT

Improvements and enhancements of the functionality of integrated access and backhaul, IAB, nodes, for a wireless communication network are described, which includes one or more base stations or integrated access and backhaul, IAB, donors, one or more IAB nodes, the IAB node connected, directly or via one or more further IAB nodes, to the IAB donor, and one or more user devices, UEs.

18 Claims, 17 Drawing Sheets

(51) Int. Cl.
*H04W 48/20* (2009.01)
*H04W 88/08* (2009.01)

(58) Field of Classification Search
CPC ..... H04W 48/08; H04W 48/12; H04W 48/18; H04W 84/005; H04W 84/047; H04W 88/04; H04W 12/04; H04W 12/06; H04W 24/08; H04W 24/10; H04W 36/0038; H04W 36/0061; H04W 36/087; H04W 74/0833; H04W 92/18; H04W 28/0236; H04W 28/0252; H04W 72/046; H04W 72/27; H04W 52/283; H04W 52/367; H04W 88/06; H04W 88/14; H04W 52/24; H04W 52/38; H04W 52/243; H04W 72/0473; H04B 7/0617; H04B 7/0686; H04B 7/0695; H04B 7/14; H04B 7/15; H04B 7/26; H04B 17/30; H04B 17/318; H04B 17/345; H04L 43/00
See application file for complete search history.

(56) References Cited

U.S. PATENT DOCUMENTS

| | | | | |
|---|---|---|---|---|
| 2021/0051558 A1* | 2/2021 | Abedini | ................ | H04W 76/10 |
| 2021/0058826 A1* | 2/2021 | Mao | .................. | H04W 28/0933 |
| 2022/0022214 A1* | 1/2022 | Akl | .................... | H04B 7/15542 |

FOREIGN PATENT DOCUMENTS

| | | |
|---|---|---|
| WO | 2021025604 A1 | 2/2021 |
| WO | 2021034514 A1 | 2/2021 |

OTHER PUBLICATIONS

3GPP TR 36.836; Technical Specification Group Radio Access Network; Evolved Universal Terrestrial Radio Access (E-UTRA); Study on mobile relay (Release 12), Study on mobile relay, Release 12, V12.0.0, 2014 (36 pages).
3GPP TS 23.122 V17.6.0 (Mar. 2022), Technical Specification Group Core Network and Terminals; Non-Access-Stratum (NAS) functions related to Mobile Station (MS) in idle mode, (Release 17) (129 pages).
3GPP TS 23.251 V16.0.0 (Jul. 2020, Network Sharing; Architecture and functional description, release 16 (39 pages).
3GPP TS 38.300, version 16.4.0 Release 16, ETSI TS 138 300 V16.4.0 (Jan. 2021), (151 pages).
3GPP TS 38.331 V16.7.0 (Dec. 2021, Technical Specification Group Radio Access Network; NR; Radio Resource Control (RRC) protocol specification. (Release 16) (963 pages).
3GPP TS 38.401, ETSI TS 138 401 V16.4.0 (Jan. 2021), Architecture description (80 pages).
3GPP TSG RAN Meeting #88e; RP-201293; New WID on Enhancements to Integrated Access and Backhaul, Rel 17; Electronic Meeting, Jun. 29-Jul. 3, 2020 (5 pages).
3GPP TSG-RAN WG3 #110-e ,Chairman, Agenda, R3-110e Meeting Report, R3-205900, Nov. 2020 (20 pages).
3GPP TSG-RAN WG3 #110-e, R3-205999, Samsung, Discussion on inter-donor IAB node migration procedure, Nov. 2020 (7 pages).
3GPP TSG-RAN WG3 Meeting #110-e, AT&T, R3-206332, Principles of Group Mobility for Inter-donor IAB-node Migration, Nov. 2020 (4 pages).
3GPP TSG-RAN WG3 Meeting #110-E, Google, R3-206292 Discussion on Inter-donor migration, 13.2.1. Inter-Donor IAB Node Migration, Nov. 2020 (5 pages).
3GPP TSG-RAN WG3 Meeting #110-e, Intel Corporation, R3-206208, Inter-Donor IAB Node Migration Enhancement, Nov. 2020 (4 pages).
3GPP TSG-RAN WG3 Meeting #110-e, R3-206586, Ericsson, Inter-donor Load Balancing in IAB Networks, Nov. 2020 (3 pages).
3GPP TSG-RAN3 Meeting #110-e, R3-206294, Catt, Inter IAB donor-CU topology adaptation, E-meeting, Nov. 2020 (4 pages).
M. Säily et al, 5G Radio Access Networks: Enabling Efficient Point-to-Multipoint Transmissions, IEEE VT Magazine, Dec. 2019 (9 pages).
Polese Michele et al: “Integrated Access and Backhaul in 5G mmWave Networks: Potential and Challenges”, IEEE Communications Magazine, IEEE Service Center, Piscataway, US, vol. 58, No. 3, Mar. 18, 2020, pp. 62-68, XP011779523 (7 pages).
R3-111e Meeting Agenda with notes, R3-xxx RAN3 Chairman Agenda, Jan.-Feb. 2021 (28 pages).
TS 38.304 v16.3.0, sections 5.2.3 and 5.2.4, (Jan. 2021), 5G; NR; User Equipment (UE) procedures in idle mode and in RRC (41 pages).
R3-109e Meeting Report, R3-206937 ETSI MCC, Report of 3GPP TSG RAN meeting #109-e, Nov. 2020—Not Available but the former document 3GPP TSG RAN meeting #109, R3-205901, ETSI MCC, Report of 3GPP TSG RAN meeting #109-e, onine Meeting, Jun. 17-Aug. 27, 2020 is attached and should be cited (226 pages).

* cited by examiner

INTEGRATED ACCESS AND BACKHAUL NODE

CROSS-REFERENCES TO RELATED APPLICATIONS

This application is a continuation of copending International Application No. PCT/EP2022/058658, filed Mar. 31, 2022, which is incorporated herein by reference in its entirety, and additionally claims priority from European Application No. EP 21 166 621.9, filed Apr. 1, 2021, which is incorporated herein by reference in its entirety.

BACKGROUND OF THE INVENTION

FIG. 1 is a schematic representation of an example of a terrestrial wireless network 100 including, as is shown in FIG. 1(*a*), the core network 102 and one or more radio access networks $RAN_1$, $RAN_2$, . . . $RAN_N$. FIG. 1(*b*) is a schematic representation of an example of a radio access network $RAN_n$ that may include one or more base stations $gNB_1$ to $gNB_5$, each serving a specific area surrounding the base station schematically represented by respective cells $\mathbf{106}_1$ to $\mathbf{106}_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure. FIG. 1(*b*) shows an exemplary view of five cells, however, the $RAN_n$ may include more or less such cells, and $RAN_n$ may also include only one base station. FIG. 1(*b*) shows two users $UE_1$ and $UE_2$, also referred to as user equipment, UE, that are in cell $\mathbf{106}_2$ and that are served by base station $gNB_2$. Another user $UE_3$ is shown in cell $\mathbf{106}_4$ which is served by base station $gNB_4$. The arrows $\mathbf{108}_1$, $\mathbf{108}_2$ and $\mathbf{108}_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(*b*) shows two IoT devices $\mathbf{110}_1$ and $\mathbf{110}_2$ in cell $\mathbf{106}_4$, which may be stationary or mobile devices. The IoT device $\mathbf{110}_1$ accesses the wireless communication system via the base station $gNB_4$ to receive and transmit data as schematically represented by arrow $\mathbf{112}_1$. The IoT device $\mathbf{110}_2$ accesses the wireless communication system via the user $UE_3$ as is schematically represented by arrow $\mathbf{112}_2$. The respective base station $gNB_1$ to $gNB_5$ may be connected to the core network 102, e.g. via the S1/NG interface, via respective backhaul links $\mathbf{114}_1$ to $\mathbf{114}_5$, which are schematically represented in FIG. 1(*b*) by the arrows pointing to “core”. The core network 102 may be connected to one or more external networks. The external network may be the Internet, or a private network, such as an Intranet or any other type of campus networks, e.g. a private WiFi or 4G or 5G mobile communication system. Further, some or all of the respective base station $gNB_1$ to $gNB_5$ may be connected, e.g. via the S1 or X2 interface or the XN interface in NR, with each other via respective backhaul links $\mathbf{116}_1$ to $\mathbf{116}_5$, which are schematically represented in FIG. 1(*b*) by the arrows pointing to “gNBs”. A sidelink channel allows direct communication between UEs, also referred to as device-to-device, D2D, communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink, uplink and sidelink shared channels, PDSCH, PUSCH, PSSCH, carrying user specific data, also referred to as downlink, uplink and sidelink payload data, the physical broadcast channel, PBCH, carrying for example a master information block, MIB, and one or more of a system information block, SIB, one or more sidelink information blocks, SLIBs, if supported, the physical downlink, uplink and sidelink control channels, PDCCH, PUCCH, PSSCH, carrying for example the downlink control information, DCI, the uplink control information, UCI, and the sidelink control information, SCI, and physical sidelink feedback channels, PSFCH, carrying PC5 feedback responses. Note, the sidelink interface may a support 2-stage SCI. This refers to a first control region containing some parts of the SCI, and optionally, a second control region, which contains a second part of control information.

For the uplink, the physical channels may further include the physical random-access channel, PRACH or RACH, used by UEs for accessing the network once a UE synchronized and obtained the MIB and SIB. The physical signals may comprise reference signals or symbols, RS, synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix, CP, length. A frame may also consist of a smaller number of OFDM symbols, e.g. when utilizing shortened transmission time intervals, sTTI, or a mini-slot/non-slot-based frame structure comprising just a few OFDM symbols.

The wireless communication system may be any single-tone or multicarrier system using frequency-division multiplexing, like the orthogonal frequency-division multiplexing, OFDM, system, the orthogonal frequency-division multiple access, OFDMA, system, or any other IFFT-based signal with or without CP, e.g. DFT-s-OFDM. Other waveforms, like non-orthogonal waveforms for multiple access, e.g. filter-bank multicarrier, FBMC, generalized frequency division multiplexing, GFDM, or universal filtered multi carrier, UFMC, may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 1 may be a heterogeneous network having distinct overlaid networks, e.g., a network of macro cells with each macro cell including a macro base station, like base station $gNB_1$ to $gNB_5$, and a network of small cell base stations, not shown in FIG. 1, like femto or pico base stations. In addition to the above described terrestrial wireless network also non-terrestrial wireless communication networks, NTN, exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like a LTE or 5G/NR network, there may be UEs that communicate directly with each other over one or more sidelink, SL, channels, e.g., using the PC5/PC3 interface or WiFi direct. UEs that communicate directly with each other over the sidelink may include vehicles communicating directly with other vehicles, V2V communication, vehicles communicating with other entities of the wireless communication network, V2X communication, for example roadside units, RSUs, roadside entities, like traffic lights, traffic signs, or pedestrians. RSUs may have functionalities of BS or of UEs, depending on the specific network configuration. Other UEs may not be vehicular related UEs and may comprise any of the above-mentioned devices. Such devices may also communicate directly with each other, D2D communication, using the SL channels.

FIG. 2 illustrates an example of an overall architecture of a radio access network, RAN, of FIG. 1, like an NG-RAN as described in 3GPP TS 38.401, Rel. 16.4, section 6. The NG-RAN comprises one or more base stations gNB1, gNB2 connected through the NG interface to the core network 5GC. The base stations gNB1 and gNB2 may be connected through the Xn interface and support an FDD mode operation, a TDD mode operation or a dual mode operation. Some or all of the base stations may be so-called distributed base stations. FIG. 2 illustrates, as an example, base station gNB2 to be a distributed base station including a central unit, CU or gNB-CU, and one or more distributed units, DU or gNB-DU. The distributed units gNB-DU are connected to the central unit gNB-CU through the F1 interface. The RAN may also support integrated access and backhaul, IAB, enabling wireless relaying in the RAN. FIG. 3(*a*) illustrates an architecture of the RAN, like the NG-RAN of FIG. 2, however, gNB2 is capable of serving one or more IAB-nodes, like IAB-node 1 and IAB-node 2, as is also described in 3GPP TS 38.401 Rel. 16.4, section 6 and in 3GPP TS 38.300, Rel. 16.4, Section 4.7. The gNB2 capable of serving IAB-nodes is also referred to as IAB-donor or terminating node of the radio interface backhauling on the network side. The IAB-node is also referred to as relaying node that supports access and backhauling via the radio interface. Backhauling may occur via a single hop or via multiple hops. The IAB-donor includes an IAB-donor-CU and one or more IAB-donor-DUs, which are connected to the IAB-donor-CU via the F1 interface. The IAB-node connects to an upstream or parent IAB-node or to the IAB-donor-DU via a subset of UE functionalities of the NR-Uu interface, also referred to as the IAB-Mobile Termination, MT, function of the IAB-node. Further, the IAB-node provides wireless backhaul to the downstream or child IAB-nodes and UEs via the network functionalities of the NR-Uu interface, also referred to as the IAB-DU function of the IAB-node. The IAB-node and the IAB-donor-CU are connected by the F1 interface for backhauling control and user traffic either directly or via one or more intermediate hop IAB-nodes. The IAB donor or the IAB-donor-CU may also be referred to as a base station, BS, since it has some BS functionality. The IAB-donor-CU may also be referred to in the following simply as CU.

FIG. 3(*b*) illustrates the parent-and-child-node relationship for an IAB-node, as described in 3GPP TS 38.300. The IAB-node includes the above-mentioned mobile termination, IAB-MT and the distributed unit, IAB-DU. The IAB-node is connected in the upstream direction to so-called parent nodes, like other IAB-nodes or the IAB-donor, e.g., via the NR Uu interface to the respective IAB-DU of the parent node. The IAB-node is connected to one or more downstream nodes, referred to as child nodes, e.g., via the IAB-DU of the IAB-node to the one or more IAB-MTs of the child nodes also via the NR Uu interface.

It is noted that the information in the above section is only for enhancing the understanding of the background of the invention and, therefore, it may contain information that does not form prior art that is already known to a person of ordinary skill in the art.

In view of the above-described prior art there may be a need for improvements or enhancements of an IAB-node, either a stationary IAB-node or a mobile IAB-node.

SUMMARY

An embodiment may have a wireless communication network, comprising: one or more base stations or integrated access and backhaul, IAB, donors, one or more IAB nodes, the IAB node connected, directly or via one or more further IAB nodes, to the IAB donor, and one or more user devices, UEs.

Another embodiment may have an integrated access and backhaul, IAB, donor configured for operating in a wireless communication network according to the invention.

Another embodiment may have an integrated access and backhaul, IAB, node configured for operating in a wireless communication network according to the invention.

Another embodiment may have a user device, UE, configured for operating in a wireless communication network according to the invention.

Another embodiment may have a method for operating a wireless communication network according to the invention.

Another embodiment may have a non-transitory digital storage medium having a computer program stored thereon to perform the method for operating a wireless communication network according to the invention, when said computer program is run by a computer.

BRIEF DESCRIPTION OF THE DRAWINGS

Embodiments of the present invention will be detailed subsequently referring to the appended drawings, in which:

FIG. 3(*b*) illustrates the parent-and-child-node relationship for an IAB-node;

FIG. 4(*b*) illustrates for a scenario similar to FIG. 4(*a*) an mIAB-node coverage without bias and with bias in accordance with embodiments of the present invention;

FIG. 4(*c*) illustrates a change of a boundary for selecting a bases station in FIG. 4(*b*) due to the dynamic bias in accordance with embodiments of the present invention;

DETAILED DESCRIPTION OF THE INVENTION

Figure 1A:
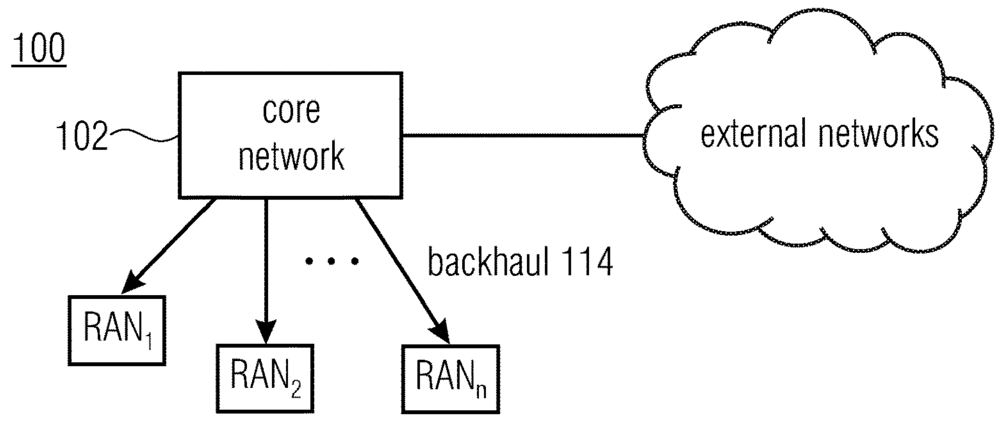
FIG. 1(*a*)-1(*b*) is a schematic representation of an example of a terrestrial wireless network, wherein FIG. 1(*a*) illustrates a core network and one or more radio access networks, and FIG. 1(*b*) is a schematic representation of an example of a radio access network RAN.
Figure 1B:
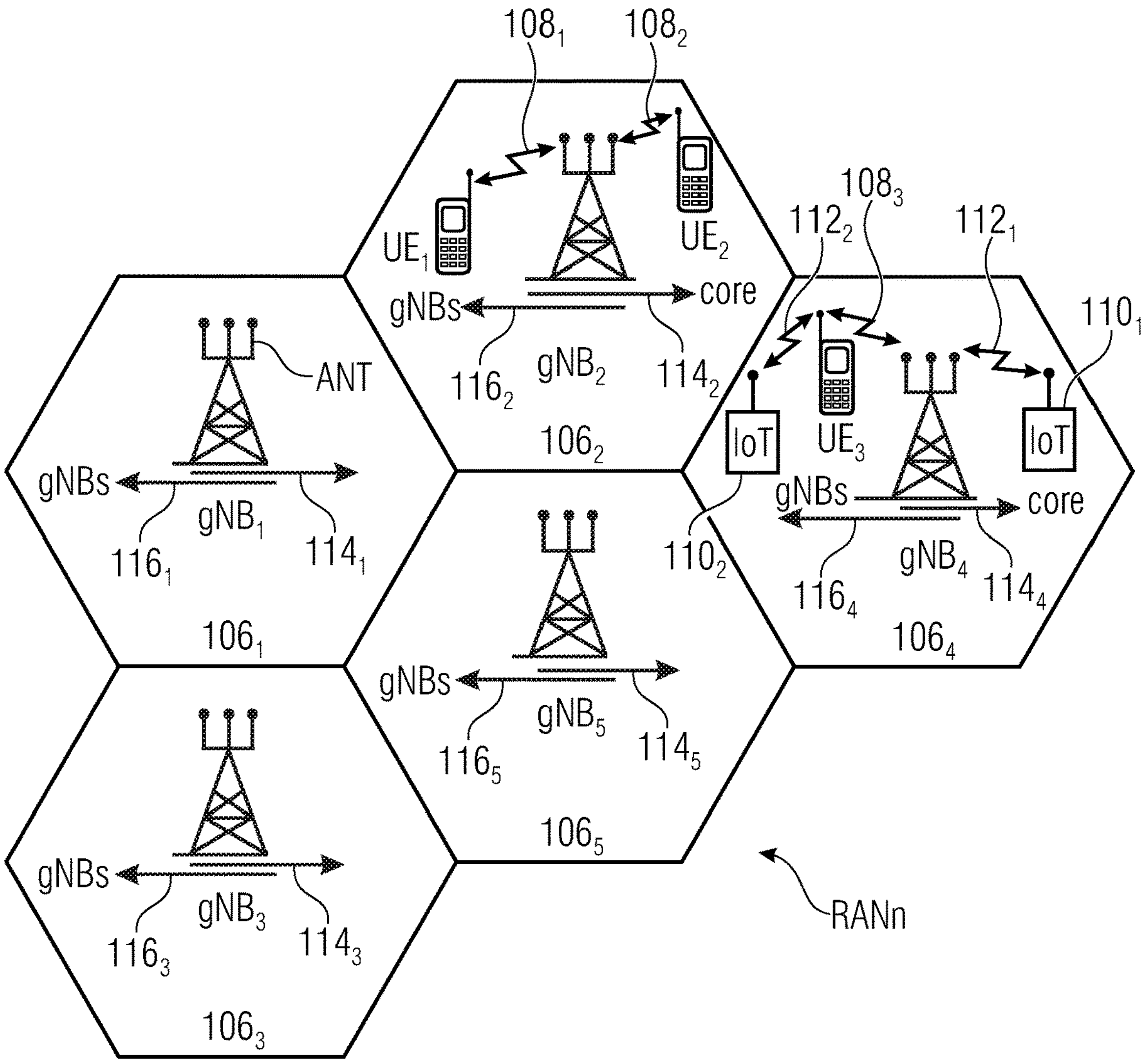

Embodiments of the present invention are now described in more detail with reference to the accompanying drawings, in which the same or similar elements have the same reference signs assigned.

In the wireless communication systems, like those described above with reference to FIG. 1, FIG. 2, FIG. 3, one or more UEs may be located within a vehicle, like a car, a train or any other kind of vehicle. In the following, embodiments are described with reference to a car, however, it is noted that the present invention is not at all limited to the implementation of a car, rather, it may be implemented in any kind of vehicle and also in non-mobile, i.e., stationary scenarios.

In accordance with embodiments, the IAB nodes are mobile or moving nodes, i.e., they are not fixed or stationary as it is in conventional IAB scenarios. FIG. 4(*a*) illustrates a scenario of a car being equipped with a relay supporting a number of UEs within the car for connecting via the relay to one or more wireless communication networks. FIG. 4(*a*), schematically, illustrates the wireless communication network 200, like a cellular network as described above with reference to FIG. 1, FIG. 2, or FIG. 3. The elements of the RAN are schematically illustrated at 202. In addition, the RAN includes a relay 204 connecting to the other elements of the RAN 202 as illustrated at 205. The relay 204 is mounted to a vehicle, in the depicted example a car 206, and the relay 204 provides access to the wireless communication network 200 for one or more UEs, like UE1, UE2 and UE3 located in the car 206 to the wireless communication network 200. The car 206 is equipped with the relay 204 so as to support the UEs within the car 206 for connecting to the wireless communication network 200, and the connection may be to at least one mobile network operator, MNO. In case all UEs belong to the same MNO the relay 204 within the car 206 being located at a suitable location of the car, like on the roof of the car, may be an IAB-node as described above with reference to FIG. 3 and, in the context of FIG. 4(*a*), may also be referred to a mobile or moving IAB-node or mIAB-node. The mobile IAB-node may provide the UEs within the coverage of the mobile IAB-node the access to the wireless communication network of the MNO to which the mobile IAB-node belongs.

The mobile or moving nature of the IAB node may be derived from its changing position or location, e.g., its changing GPS coordinates, and/or by measurements, e.g., a reporting of the channel between the mIAB-node, like its mobile termination, MT, and the fixed or stationary infrastructure, like the IAB donor or IAB-donor-CU gNB, where a change in path-loss and more time and frequency variant channel for the mIAB node indicates the node to be mobile.

A UE may identify an IAB node to be a mobile or moving IAB node when one or more measurements performed by the UE on a connection between the UE and the IAB node remain constant or within predefined boundaries while e.g. its own GPS coordinates are changing. This indicates that the connection between the UE and the IAB node is static or quasi-static. For example, a static connection may be assumed in case, during a certain time period, there are no cell changes of the number of cell changes stays below a certain threshold. The measurements may include one or more of the following: a path loss, a Reference Signal Received Power, RSRP, a Signal to Noise and Interference Ratio, SINR, a frequency flat channel, and the like. Further, the UE needs to detects that it is also mobile or moving. The UE may evaluate its own movements, e.g., using a measurement of its velocity, or a change of its coordinates, like the Global Positioning System, GPS, coordinates, or the UE may detect other radio signals with higher variance in path loss, time and frequency selective radio channels.

Mobile relays for wireless communication networks, for example, on high-speed trains, busses and the like, have been studied for quite some time, for example in [1] and [2]. These architectures, however, are based on Layer 3 relays and do not support mmWave frequencies. Thus, embodiments of the present invention provide enhancements and improvements of an IAB node addressing mobility aspects using relays which support mmWave and multi-hop communication with more than two hops and represent a chosen network relay architecture, for example in 5G.

Moreover, IAB-nodes, so far, have been considered to be stationary only, and the aspects of a mobile IAB-node is not a part of the current 3GPP studies. At present, only an IAB-node migration has been discussed, for example in [3], [4], [5] and [6]. IAB-node migration is also discussed in [8], [9] and [10]. In accordance with such approaches, the migration of an IAB-node to another donor may include the migration of descendant IAB-nodes, also referred to as child nodes, and UEs. When considering a migration of an IAB-node, the main mechanism for a single-connected IAB-node is the handover, HO. For a single-connected IAB-node the dual active protocol stack, DAPS, as well as conditional handover, CHO, scenarios are considered in 3GPP. Also dual connectivity, DC, may be applicable in case the IAB-node is dual-connected to two parent nodes. In the above references, also a group handover is considered, in which the sequence of handover is important, i.e., whether the top-down or bottom-up migration is taking place, i.e. if the migrating IAB-node is to be migrated first followed by the descendants—child nodes and the UEs or the other way around. There may also be nested sequences, and specific examples for such a handover are described in [7], [8] and [9]. An overload situation in case of an HO towards a target base station or CU is considered in [10] and [11], the latter describing also messages for moving the UE/MT context. An example for different stages of an IAB-node migration to a different bases station or CU is described in [12]. Thus, embodiments of the present invention relate to mobile IAB-nodes and address the specific issues encountered in a mobile scenario, like the scenario of FIG. 4(*a*). Stated differently, mobile aspects of the IAB scheme have not yet been discussed in the art.

Further, in conventional relay approaches it is assumed that all UEs connecting via the relay to the network belong to the same mobile network operator. However, this is not necessarily the case. For example, in a scenario as illustrated in FIG. 4(*a*) it may be that the UEs located within the car are associated with or are subscribed to different mobile network operators. For example, in FIG. 4(*a*) UE1 and UE3 may be assumed to belong to a first mobile network operator, while UE2 may belong to a second, different mobile network operator. Such a scenario, in accordance with which the UEs are to be connected to different MNOs, provides additional challenges, especially in case of a mobile IAB-node as described with reference to FIG. 4(*a*). For example, in such a scenario it may be advantageous if the relay 204 provides access to all UEs in the car 206 and not only to the users of the network to which the relay 204 belongs or is subscribed to. As far as multi MNO scenarios are concerned, there are some architectures and mechanisms that enable multiple operators to share a part of the network, e.g., the core network or the RAN as described in more detail in [13] describing a so-called multi-operator core network, MOCN, or a multi-operator radio access network, MORAN, for sharing infrastructure and network components and functions between two or more MNOs. Thus, embodiments of the present invention address specific issues and problems associated with a multi-MNO scenario, e.g., the access of multiple UEs via a relay, like an IAB-node, either mounted in a vehicle or being stationary, that needs to provide access and backhaul connectivity using a shared spectrum or a dedicated spectrum on the access side and shared or separate backhaul connections.

Access Using Dedicated or Exclusive Spectrum Per MNO

The current IAB-node architecture, like the one described above with reference to FIG. 3(*a*) and FIG. 3(*b*), features the distribution unit, DU, entity and the mobile termination, MT, entity. The DU entity provides conventional DU functionality on the access side, and the MT entity provides a subset of UE functionality, for example enabling the upstream connectivity towards the IAB-donor or the core network. However, current IAB architecture options consider only a dedicated spectrum, i.e., only use cases with the dedicated spectrum for a single MNO. Embodiments of the present invention provide access to all UEs, like those described above with reference to FIG. 4(*a*), via the relay or the IAB-node regardless of their subscription to a particular MNO. Further, the connection to the IAB-donor or core network may include a shared backhaul connection or a dedicated backhaul connection, and embodiments of the present invention provide a shared backhaul in which all data streams go to a common network element, like a common IAB-donor or base station, or a dedicated backhaul in accordance with which each MNO routes its traffic to its own network element, like its own IAB-donor or base station.

For the shared backhaul, embodiments of the present invention provide specific DU and/or MT implementation options. Embodiments address the requirements on the mapping of the access flows from different UEs coming from different MNOs onto the one or more backhaul links provided by a single MNO, for example to ensure the quality of service, QoS, in the access and backhaul connection, especially when considering different traffic types, like high priority traffic, for example emergency calls, or low priority traffic, for example traffic associated with an enhanced mobile broadband, (eMBB).

For the dedicated backhaul, embodiments of the present invention provide specific DU and/or MT implementation options. Embodiments address the requirements on the mapping of the access flows from different UEs coming from different MNOs onto the one or more backhaul links of the respective MNOs, i.e., each MNO has its own backhaul flow, for example to ensure the QoS in the access and backhaul connection, especially when considering the above mentioned different traffic types. Further embodiments concern the selection of the path and the incorporation of the path prediction or announcement, like the path from the IAB-donor to an IAB-node, like a mobile or vehicular IAB-node.

Further embodiments of the present invention provide a modification of the current MOCN solution supporting a shared base station or IAB-donor.

Both for the shared and dedicated backhaul approaches embodiments of the present invention address specific mobility and radio resource management, RRM, issues. More specifically, embodiments

- define a path from an IAB-donor to the IAB-node;
- handle group mobility in case of different IAB implementations options, e.g., when the relay or IAB-node is moving to a different IAB-donor, in accordance with embodiments, a handover may be handled as a group handover;
- provide neighborhood lists given by an IAB-donor, e.g., conventionally, a neighborhood list is provided by the IAB-donor which, in accordance with embodiments may be a shared IAB-donor CU so that embodiments concern the handing of the neighborhood list, like where the decision making of the neighborhood list is performed, how it is signaled and how UEs below the relay or IAB-node are considered with respect to UEs not connected to the relay;
- provide a concept of path prediction and/or announcement;
- concern the handling of UE measurements, which may be reported to the IAB-node, to the IAB-donor or to both,
- concern a location where the decision making with regard to measurement settings is done, for example what measurements are taken, what the purpose of the measurement is in terms of system enhancements, how to keep a UE within the connection of a relay.

Shared Spectrum on the Access

Further embodiments of the present support the sharing of the spectrum, using a dedicated licensed spectrum and/or an unlicensed spectrum.

Figure 2:
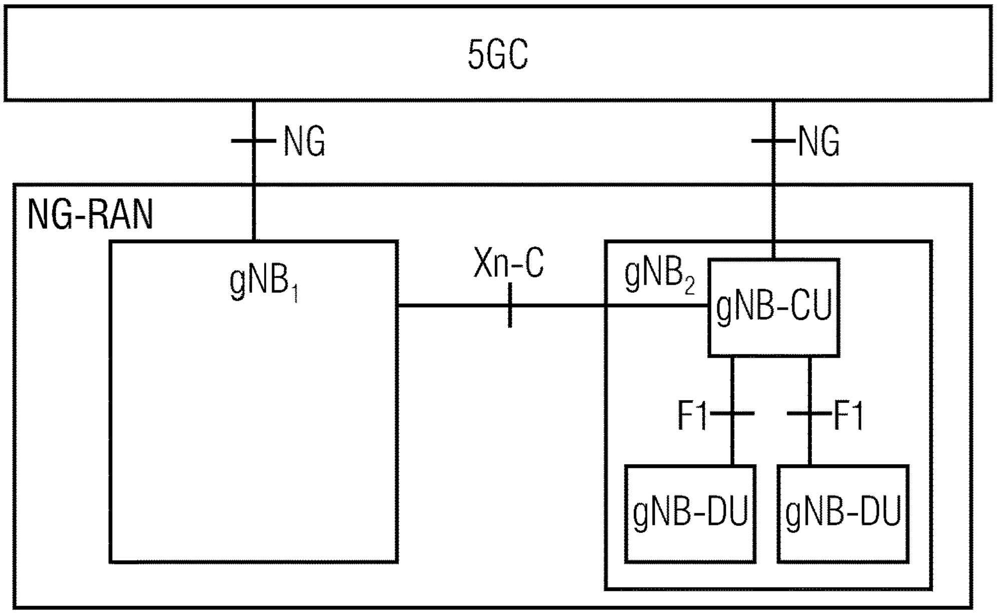
FIG. 2 illustrates an example of an overall architecture of a radio access network, RAN, of FIG. 1.
Figure 3A:
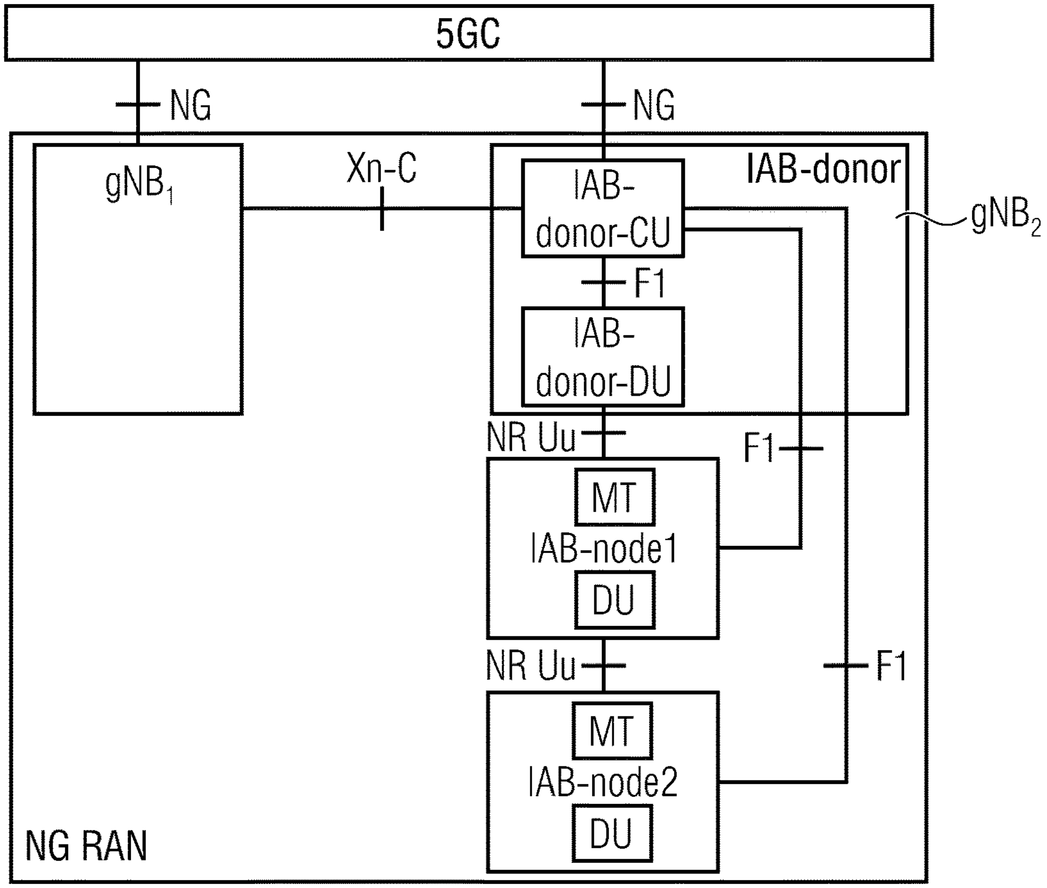
FIG. 3(*a*) illustrates an architecture of the RAN, like the NG-RAN of FIG. 2, capable of serving one or more IAB-nodes.
Figure 3B:
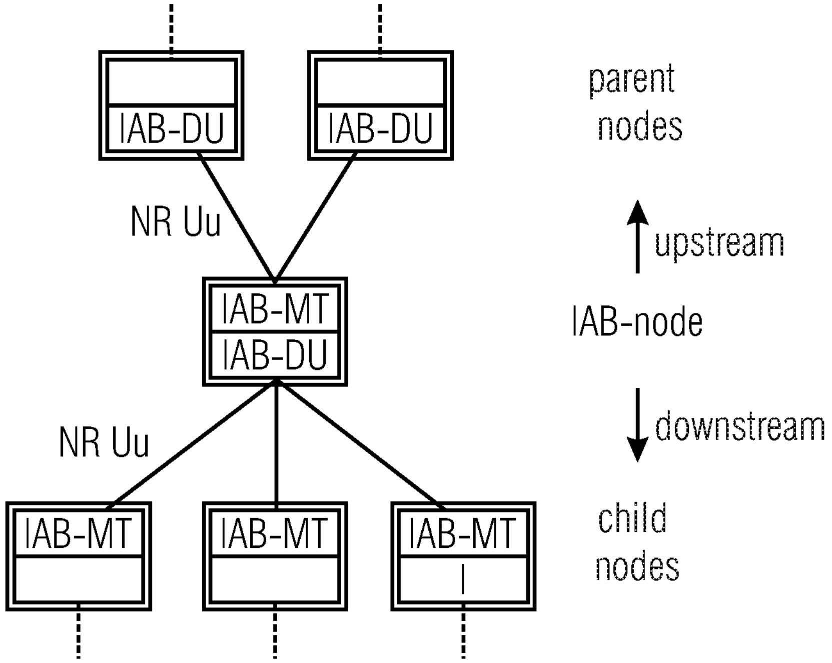
Figure 4A:
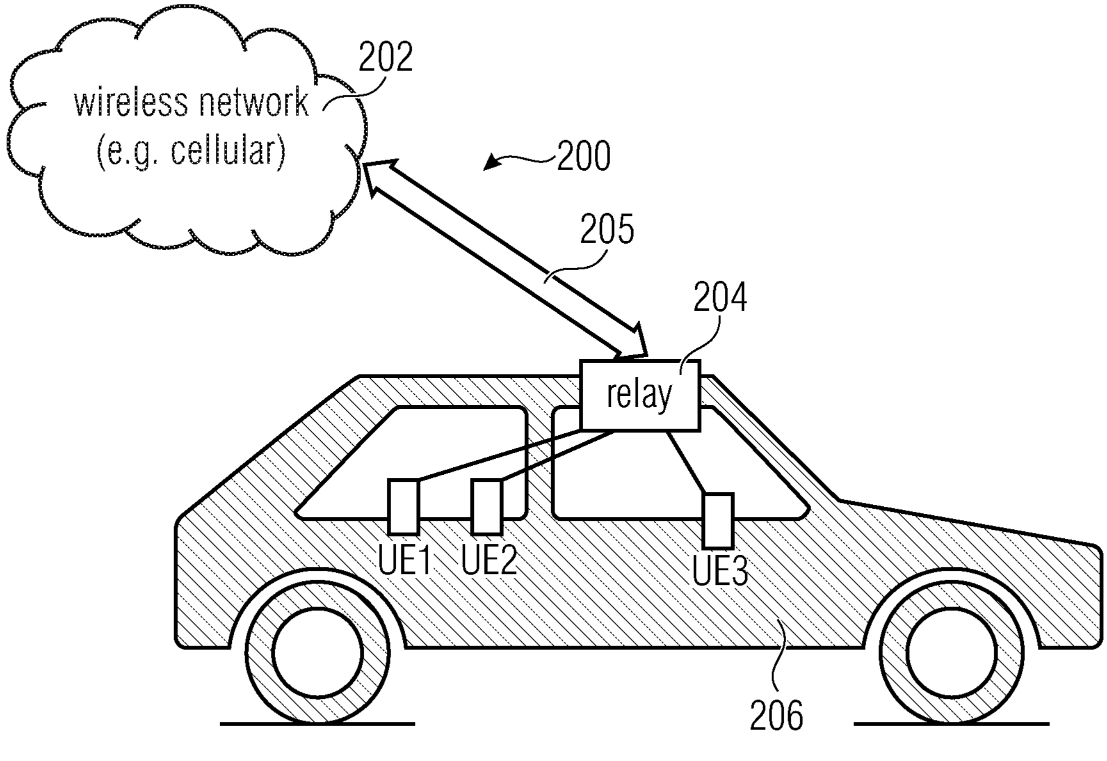
FIG. 4(*a*) a scenario of a car being equipped with a relay supporting a number of UEs within the car for connecting via the relay to one or more wireless communication networks.
Figure 4B:
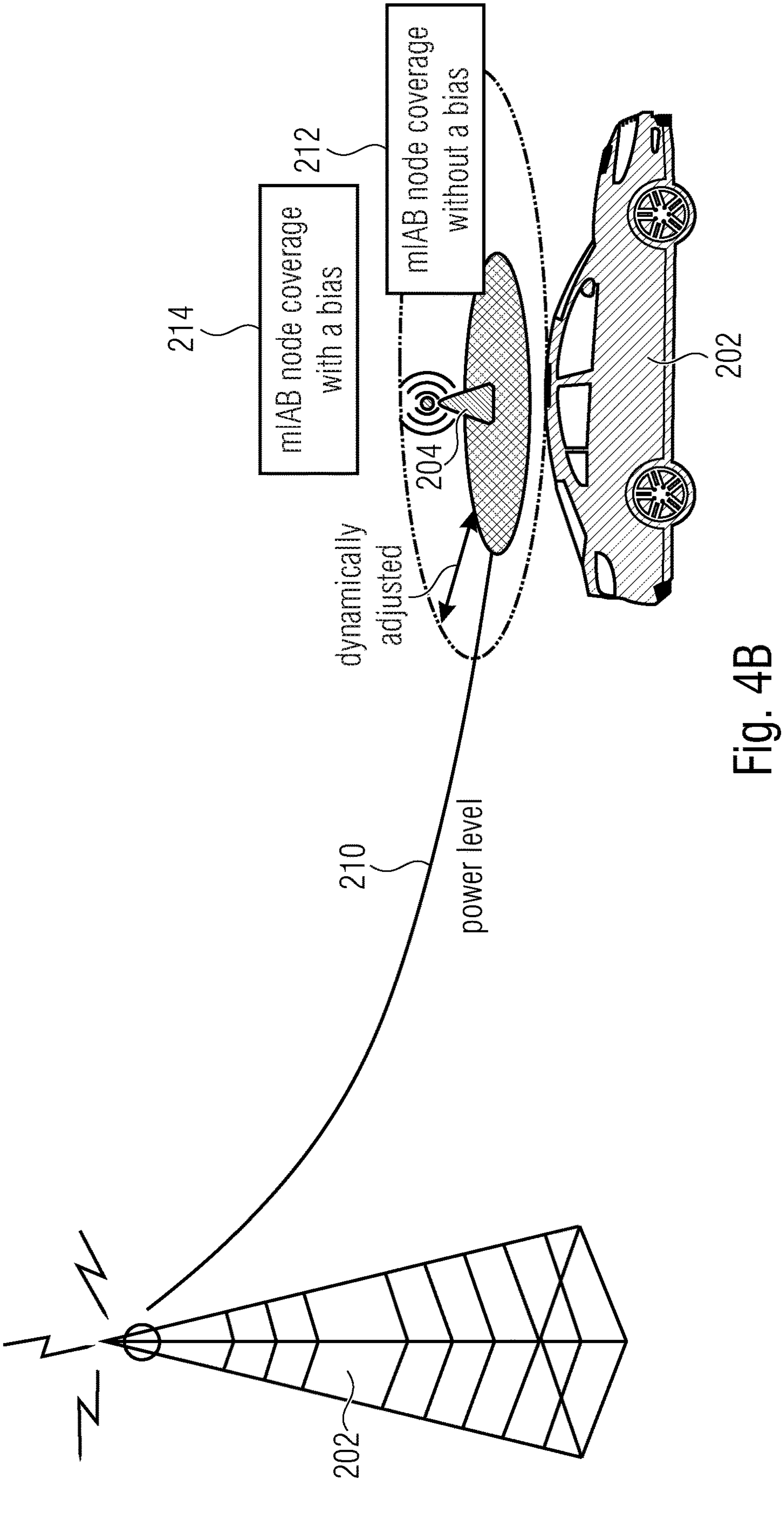
Figure 4C:
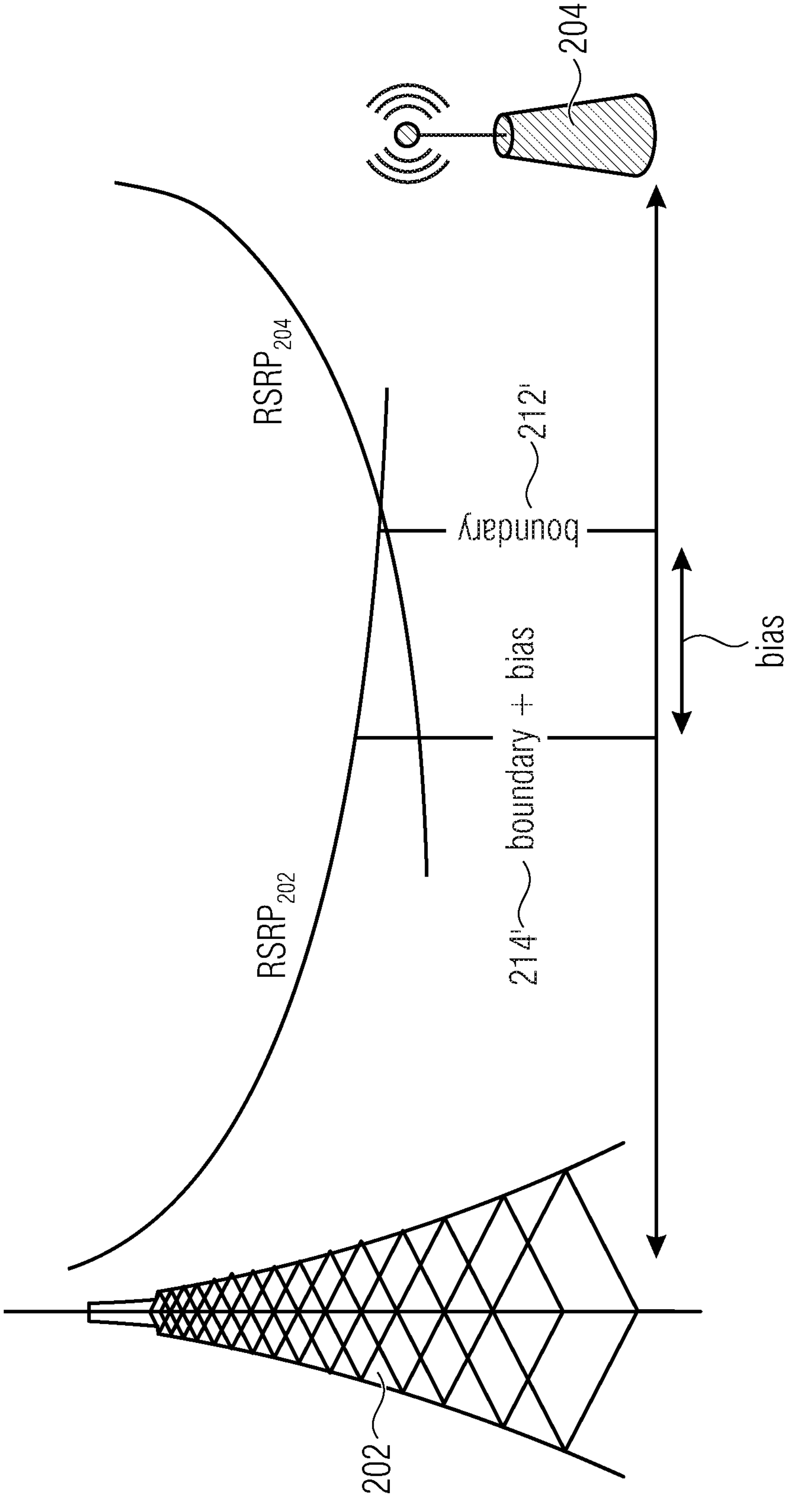
Figure 5:
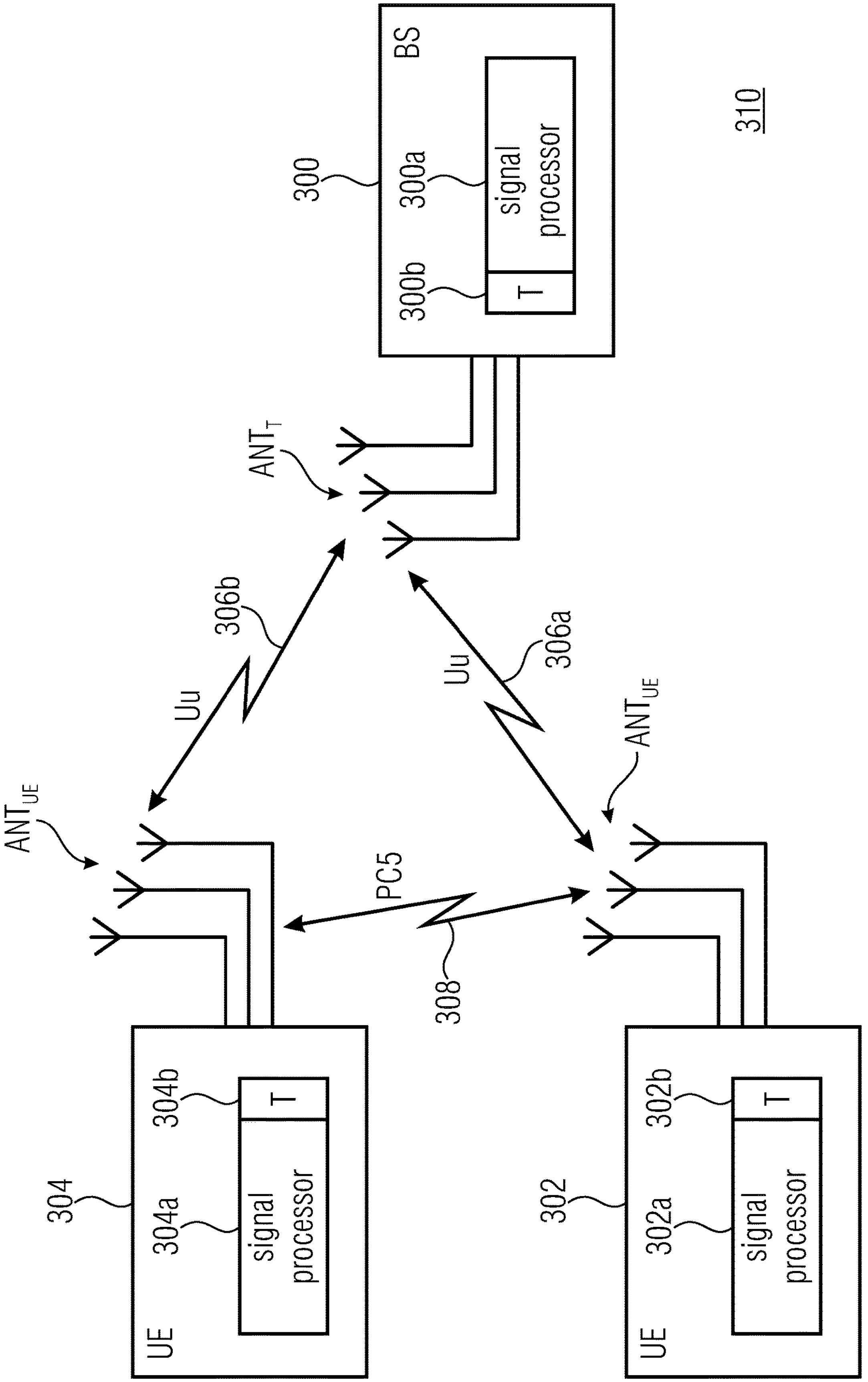
FIG. 5 is a schematic representation of a wireless communication system including a transmitter, like a base station, one or more receivers, like user devices, UEs, and one or more relay UEs for implementing embodiments of the present invention.
Figures 1, 11:
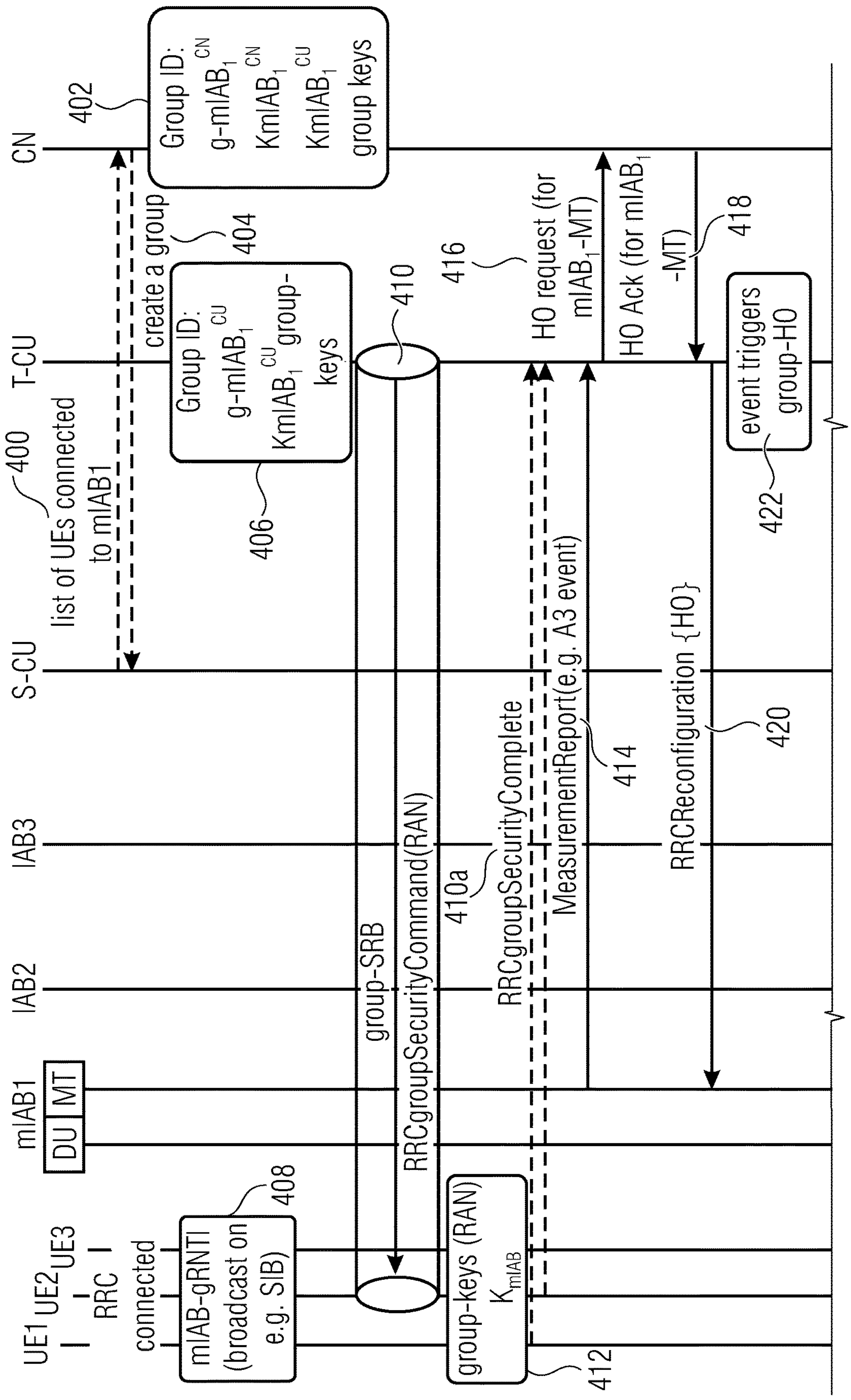
FIG. 11 illustrates a signaling procedure for a group-SRB in accordance with embodiments of the invention.
Figures 2, 11:
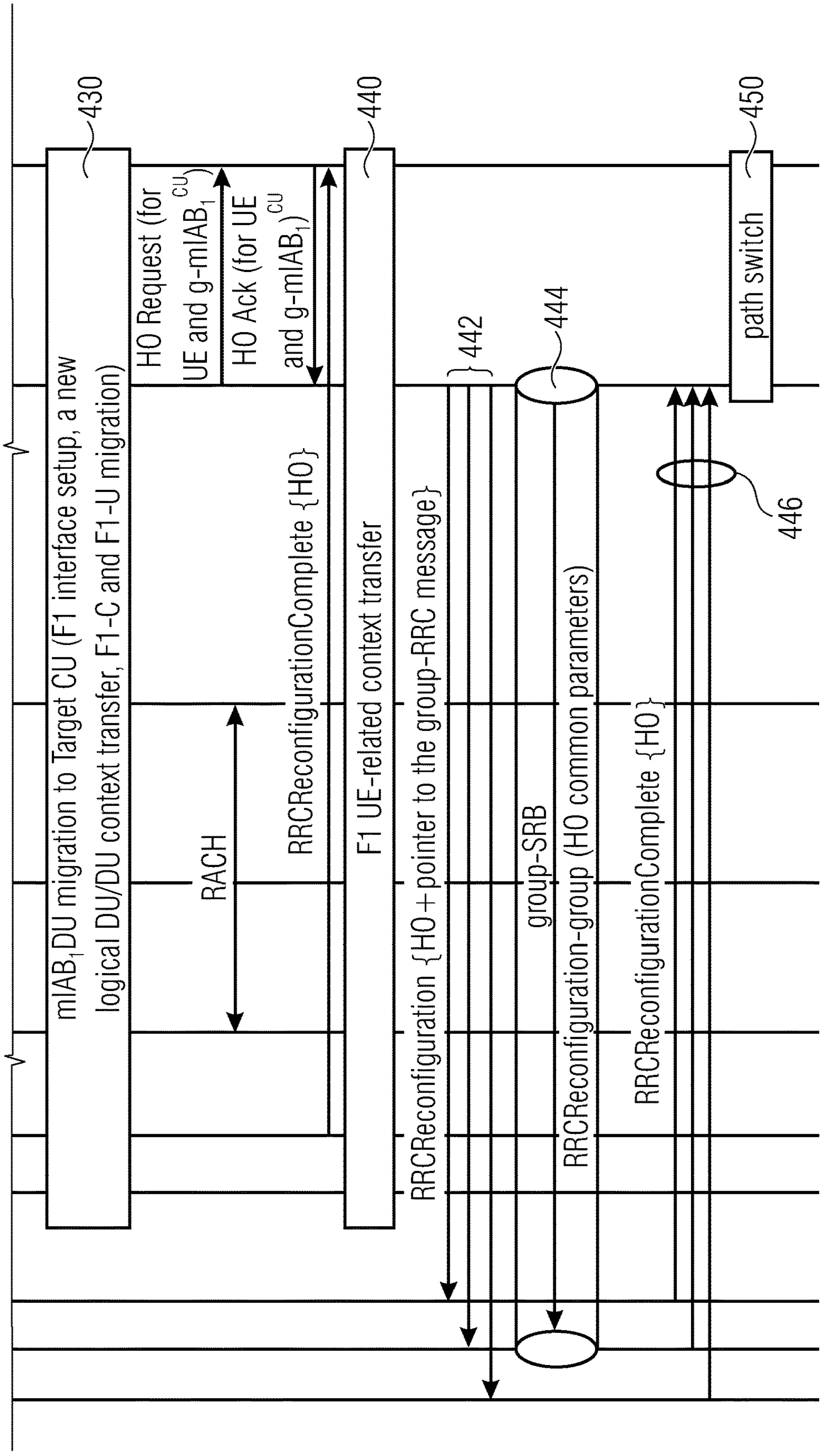

Embodiments of the present invention may be implemented in a wireless communication system as depicted in FIG. 1, FIG. 2 or FIG. 3 including base stations and users, like mobile terminals or IoT devices. FIG. 5 is a schematic representation of a wireless communication system including a transmitter 300, like a base station or gNB, one or more user devices, UEs, 302, 304. The transmitter 300 and the receivers 302, 304 may communicate via the respective relaying entities 306, 308, 310 using respective wireless communication links or channels 306*a*, 306*b*, 308, like respective radio links. The transmitter 300 may include one or more antennas $ANT_T$ or an antenna array having a plurality of antenna elements, a signal processor 300*a* and a transceiver 300*b*, coupled with each other. The receivers 302, 304 include one or more antennas $ANT_{UE}$ or an antenna array having a plurality of antennas, a signal processor 302*a*, 304*a*, and a transceiver 302*b*, 304*b* coupled with each other. The base station 300 and the UE 302 may communicate directly or via a relaying entity using the wireless communication link 306*a*. Likewise, the base station 300 and the UE 304 may communicate directly or via a relaying entity using the wireless communication link 306*b*. The UEs 302, 304 may communicate with each other directly or via a relaying entity using the wireless communication link 308, like a radio link using the SL interface. Any one of the system or network, the one or more UEs 302, 304, the one or more relaying entities 306-310 and/or the base station 300, as illustrated in FIG. 5, may operate in accordance with the inventive teachings described herein.

System/Network

The present invention provides a wireless communication network, comprising: one or more base stations or integrated access and backhaul, IAB, donors, one or more IAB nodes, the IAB node connected, directly or via one or more further IAB nodes, to the IAB donor, and one or more user devices, UEs.

In accordance with embodiments, at least one of the IAB nodes is

- a mobile or moving IAB node, like an IAB node in a vehicle, or
- a stationary IAB node capable of connecting to the one or more IAB donors via different backhaul links.

In accordance with embodiments, a UE is to identify an IAB node to be a mobile or moving IAB node

- when one or more measurements performed by the UE on a connection between the UE and the IAB node remain constant or within predefined boundaries, thereby indicating the UE's connection to the IAB node to be static with no or a number of cell changes below a threshold, wherein the measurements may include one or more of the following: the path loss, the Reference Signal Received Power, RSRP, the Signal to Noise and Interference Ratio, SINR, a frequency flat channel, and/or
- when the UE detects that it is mobile, e.g., by evaluating its own movements, wherein the UE may evaluate its own movements by one or more of the following: a measurement of its velocity, a change of the Global Positioning System, GPS, coordinates, detecting other radio signals with higher variance in path loss, frequency selective radio channels.

In accordance with embodiments, the UE is to monitor one or more cell selection and/or reselection parameters associated with the IAB-donor central unit and/or associated with the IAB node, like signal strength parameters, e.g., the Reference Signal Received Power, RSRP, and/or the Reference Signal Received Quality, RSRQ, and for connecting to the IAB node or for staying connected to the IAB node, the UE is to add a bias to the cell selection and/or reselection parameter associated with the IAB node.

In accordance with embodiments, the bias is a dynamic bias, the dynamic bias being selected from a list or set of bias values or being determined by one or more of:

- the IAB node,
- the IAB-donor central unit,
- the core network, CN,
- another UE, and the bias is signaled to the UE.

In accordance with embodiments, selecting the dynamic bias from the list or set of bias values or determining the bias is based on one or more of the following:

- one or more measurement reports, MRs, from an IAB mobile termination, IAB-MT, of the IAB node, and by combining the MRs and one or more cell selection and/or reselection parameters for an IAB distribution unit, IAB-DU, of the IAB node previously configured by the IAB-donor,
- a condition of a backhaul network, e.g., a load on or a failure of one or more links in the backhaul network,
- a signal from the IAB node, like the IAB-DU, indicative of a load of the IAB-DU exceeding a predefined threshold,
- a configuration update from the IAB node, like the IAB-DU, due to a certain situation, like a load exceeding a predefined threshold, the configuration update indicating, e.g., an adjustment of the bias by a value from a predefined and/or ordered set of biases.

In accordance with embodiments, the one or more measurement reports, MRs, are based on a measurement of one or more cells of one or more neighboring cells, using parameters that the UE also uses for selection and/or reselection, the one or more neighboring cells comprising cells of one or more base stations and/or of the one or more further IAB nodes.

In accordance with embodiments, the dynamic bias is to be signaled, e.g., as an absolute value or as relative value with regard to a current bias, using system block information, the system block information including one or more fields, which indicate the absolute or relative value of the dynamic bias for one or more IAB nodes, and, optionally, any other delta cell selection and/or reselection parameters to be signaled to the UE.

In accordance with embodiments, in case the system block information, like the SIB2, SIB3 or SIB4, indicates the dynamic bias for a plurality of IAB nodes, the UE is to connect to a certain IAB node or to stay connected to a certain IAB node, if over a certain period of time, the certain IAB node is ranked first according to the adopted one or more cell selection and/or reselection parameters, or the relationship between the IAB node and the UE is quasi-static or a change in path-loss is below a certain threshold.

In accordance with embodiments, in case the UE is not in a connected state, like the idle state, or during a connection procedure, like a Random Access Channel, RACH, procedure, the UE or the IAB donor is to decide whether the UE is to access the wireless communication network via the IAB central unit or via the IAB node, and the UE may decide to access the wireless communication network via the IAB node in case one or more cell selection and/or reselection parameters associated with the IAB node, like signal strength parameters, e.g., the Reference Signal Received Power, RSRP, and/or the Reference Signal Received Quality, RSRQ, exceed corresponding cell selection and/or reselection parameters configured with the IAB central unit, and the IAB donor and/or the IAB central unit may decide that the UE is to access the wireless communication network via the IAB node dependent on one or more criteria or features of the UE and/or the IAB node.

In accordance with embodiments, in case the UE is not in a connected state, like the idle state, or the UE is during a connection procedure, like a Random Access Channel, RACH, procedure, the IAB node is to signal, using, e.g., PRACH Msg2, that it is an IAB node, and the UE is to decide whether to continue the connection procedure or whether to abort the connection procedure.

In accordance with embodiments, for connecting to a certain IAB node or for staying connected to a certain IAB node, the UE is to determine whether a position of the UE is within a certain distance from a position of the certain IAB node, e.g., based on the geographical locations or on the cell IDs of the UE and IAB node, or based on an analysis of a wireless channel between the UE and IAB node, e.g., using the time and frequency selectivity of the channel, and the position of the certain IAB node may be signaled to the UE by the certain IAB node or by the IAB donor, e.g., by signaling the GPS position of the IAB node.

In accordance with embodiments, in case the UE is in a connected state with a certain IAB node, like the RRC connected state, the UE is to

- stay connected to the certain IAB node in case a change of one or more monitored cell handover-related parameters are below a certain threshold, and
- perform a handover to another IAB node, in case a change of one or more monitored handover-related parameters meets one or more criteria.

In accordance with embodiments, the one or more criteria comprise a dynamic threshold or hysteresis or offset determined by the IAB donor or by both the IAB node and the IAB donor.

In accordance with embodiments, the IAB donor is to set the dynamic threshold or hysteresis or offset based on one or more of the following:

- one or more measurement reports, MRs, from the UE and/or from an IAB-MT of the IAB node,
- a condition of a backhaul network, e.g., a load on or a failure of one or more links in the backhaul network,
- a signal from the IAB-DU indicative of a load of the IAB-DU exceeding a predefined threshold,
- a configuration update from the IAB node, like the IAB-DU, due to a certain situation, like a load exceeding a predefined threshold, the configuration update indicating, e.g., an adjustment of the threshold or hysteresis or offset by a value from a predefined and/or ordered set.

In accordance with embodiments, the IAB node is to set the dynamic threshold or hysteresis or offset based on one or more of the following:

- surrounding cells, e.g., by adapting the threshold or hysteresis or offset so that the UEs stay connected also in case the surrounding cells of IAB nodes or base stations transmitting at a power exceeding a certain level,
- a number of UEs connected to the IAB node, e.g., by adapting the threshold or hysteresis or offset so that a certain number of UEs are gradually disconnected,
- a vehicle carrying a mobile IAB node stopping, e.g., by adapting the threshold or hysteresis or offset so that the UEs is handed over to an IAB central unit or base station outside the vehicle.

In accordance with embodiments, the wireless communication network, e.g., the IAB donor or a core entity, is to provide a list of some or all IAB nodes, e.g., based on a physically layer cell id, PCID, and/or some other identifier, and the wireless communication network is to provide the list of IAB nodes to a certain UE via an IAB node or via an IAB central unit to which the certain UE is connected, or via a sidelink between the certain UE and a further UE connected to an IAB node or to a base station.

In accordance with embodiments, the wireless communication network comprises a plurality of wireless communication networks operated by respective mobile network operators, MNOs, and the list includes one or more mobile IAB nodes allowing access by all or a group of UEs subscribed to a wireless communication network that is the same or different from the wireless communication network to which the mobile IAB node is subscribed, e.g., based on a roaming agreement and the like.

In accordance with embodiments, the UE is to report to wireless communication network the entering or leaving of a proximity of one or more cells including a mobile IAB node from the list.

In accordance with embodiments, when being connected to the further UE via the side link,

- the certain UE is to receive from the further UE an indication that the further UE is currently connected to a certain IAB node, and/or
- the certain UE, depending on a distance between the certain UE and the further UE, is to decide to handover to the certain IAB node.

In accordance with embodiments, the indication may include a cell identification, like the Primary Cell ID, PCID, and, optionally, further information allowing the certain UE to estimate whether, in case of the certain IAB node being a mobile IAB node in a vehicle, the certain UE and the further UE are in the same vehicle.

In accordance with embodiments, the wireless communication network is to provide the list of IAB nodes to a certain UE connected to a certain IAB node responsive to the certain UE leaving the certain IAB node or responsive to determining that the certain UE is likely to leave the IAB node within a certain time period, so as to provide the certain UE information about a tracking area defined by the list of IAB nodes.

In accordance with embodiments, the wireless communication network comprises a plurality of wireless communication networks operated by respective mobile network operators, MNOs.

In accordance with embodiments, the IAB node comprises

- a plurality of IAB distribution units, IAB-DUs, so as to simultaneously provide respective dedicated spectra for serving UEs of different MNOs, or
- at least one IAB-DU so as to provide sequentially dedicated spectra for serving UEs of different MNOs.

In accordance with embodiments, the IAB node comprises at least one IAB distribution unit, IAB-DU, so as to provide a shared spectrum for serving simultaneously UEs of two or more different MNOs.

In accordance with embodiments, the IAB node, like a mobile IAB node in a vehicle, is to signal that UEs, e.g., UEs in the coverage of the IAB node, are allowed to use one or more of the pluralities of wireless communication networks for accessing the IAB node, wherein in case the UE is subscribed to one of the signaled wireless communication networks, the UE is to access the shared spectrum of the UE's MNO, and/or in case the UE is not subscribed to one of the signaled wireless communication networks, the UE is to access the shared spectrum of the MNO different form the UE's MNO responsive to an additional procedure facilitating an automatic or semi-automatic attachment of the UE to the shared spectrum.

In accordance with embodiments, the additional procedure comprises one or more of the following.

- a mechanism in the form of software inside the UE, e.g., provided by the UE's operating system, OS, or loaded by the UE as an application, the mechanism initiating a reconfiguration of network selection preferences of the UE in case of external triggers, like a Service Set Identifier, SSID, provided by a Wi-Fi application inside a vehicle including the IAB node, a particular Bluetooth Low Energy, BLE, beacon, a scan of a QR-code inside a vehicle including the IAB node, an interface provided by an onboard unit, OBU, of a vehicle including the IAB node via a cable, a BLE connection, or alike,
- a preconfigured profile provided by the UE's MNO or home network operator, allowing local and temporary roaming in other networks within the network coverage of the UE's own network,
- a mechanism in the form of a signaling send by the IAB central unit serving the UE in response to a request by the UE, the mechanism allowing local and temporary roaming in other networks within the network coverage of the UE's own network, wherein the UE may send the request responsive to detecting access points of one or more other MNOs in the vicinity of the UE and having a relative mobility with respect to the UE being below a certain threshold, like zero or close to zero.

In accordance with embodiments, the IAB node, like a mobile IAB node in a vehicle, is to provide for the UEs in the coverage of the IAB one or more unlicensed bands to be used for accessing the IAB node, and the UE is to access the IAB node using the unlicensed band, e.g., NR-Unlicensed responsive to receiving from the IAB node a signaling indicating the one or more unlicensed bands or responsive to the UE having scanned the spectrum for the one or more unlicensed bands.

In accordance with embodiments, the signaling, like SIB1, includes respective identifications, like a PLMN-ID, associated with the plurality of wireless communication networks, and wherein a UE supporting NR-Unlicensed and whose PLMN is signaled is allowed to use IAB node as an access node.

In accordance with embodiments, an IAB mobile termination, IAB-MT, of the IAB node, like a mobile IAB node in a vehicle, is to provide the coverage via the IAB backhaul connection, and an IAB distributed unit, IAB-DU, is to provide access using a spectrum in one or more unlicensed bands, like a WiFi spectrum, so as to provide an access point, like a non-3GPP access point, for accessing one or more services, like the Internet, and the UE is to access the one or more services via the unlicensed band responsive to receiving from the IAB-MT or the IAB-DU a signaling indicating the one or more unlicensed bands or responsive to the UE having scanned the spectrum for the one or more unlicensed bands.

In accordance with embodiments, for using a backhaul connection via an IAB-MT of the IAB node, like a mobile IAB node in a vehicle, the UE is to perform a local authentication via IAB distributed unit, IAB-DU, wherein the local authentication may include one or more of the following:

- a QR code reading from inside the vehicle,
- exploiting a proximity detection using, e.g., near field communication, NFC,
- pairing via the OBU using, e.g., BLE,
- BLE handshaking between UEs,
- using an authentication token provided by another UE already connected to the IAB node via a sidelink to the UE.

In accordance with embodiments, the IAB node comprises

- a plurality of IAB distribution units, IAB-DUs, so as to simultaneously provide respective dedicated spectra for serving UEs of different MNOs, or
- at least one IAB-DU so as to provide sequentially dedicated spectra for serving UEs of different MNOs, and a backhaul link provided by the IAB node for a certain MNO comprises one or more IAB mobile terminations, IAB-MTs, to connect individual or selectively, directly or via one or more further IAB nodes, to an IAB donor associated with the certain MNO.

In accordance with embodiments, in case of connecting to the IAB donors via two or more IAB-MTs, the IAB node is to

- select for the certain MNO one or more of the IAB-MTs as the backhaul link, according to one or more criteria defined by the certain MNO, and/or
- add or remove one or more the IAB-MTs from the backhaul link for the certain MNO, according to one or more criteria defined by the certain MNO.

In accordance with embodiments, the one or more criteria comprise one or more of:

- a backhaul capacity or maximum delay or jitter goal/target of UEs associated with the certain MNO,
- a certain share of data, e.g., in terms of quota or amount of URLLC data.

In accordance with embodiments, the IAB node comprises

- a plurality of IAB distribution units, IAB-DUs, so as to simultaneously provide respective dedicated spectra for serving UEs of different MNOs, or
- at least one IAB-DU so as to provide sequentially dedicated spectra for serving UEs of different MNOs, and the IAB node comprises for the MNOs at least one IAB mobile termination, IAB-MT, to provide a shared backhaul link, directly or via one or more further IAB nodes, to a shared IAB donor, the shared IAB donor being connectable to the respective MNOs.

In accordance with embodiments, the shared backhaul link comprises a backhaul Radio Link Control, BH RLC, channel group including a plurality of RLC channels, and wherein each MNO is assigned to a separate operator-specific RLC channel.

In accordance with embodiments, the shared IAB donor is to divide control plane functions and user plane functions between common parts and operator specific parts.

In accordance with embodiments, to provide common and operator specific parts of the control plane functions and user plane functions, the IAB donor is to provide operator-specific instances of the F1 interface with appropriate common and operator-specific identifiers, so that instances of the F1 interfaces may be differentiated.

In accordance with embodiments, the IAB node is a mobile IAB node in a vehicle serving a plurality of UEs located in the vehicle, the plurality of UEs being a group of UEs, and a certain signaling, like a mobility-related signaling, for a certain UE in the group comprises a first part individual to the certain UE and a second part common to some or all UEs of the group, and the IAB node comprises at least one IAB mobile termination, IAB-MT, to provide a backhaul link, directly or via one or more further IAB nodes, to an IAB donor, and responsive to a certain event, such as an IAB-MT measurement report or an IAB-MT handover, the IAB donor is to signal the first parts of the certain signaling for the UEs of the group and only one second part of the certain signaling for the UEs of the group.

In accordance with embodiments, the IAB donor is to signal the first parts of the certain signaling via the IAB node, directly or via one or more further IAB nodes, to the respective UEs, and the IAB donor is to signal only one second part of the certain signaling, directly or via one or more further IAB nodes, to the IAB node, and the IAB node is to distribute the second part to some or all of the UEs of the group.

In accordance with embodiments, the first parts of the certain signaling are encrypted using respective user-specific encryptions, and the second part of the certain signaling is encrypted using a common group encryption, and the IAB donor is to send only one signal including the encrypted first parts and the encrypted second part of the certain signaling, directly or via one or more further IAB nodes, to the IAB node and to the respective UEs, and the IAB node is to decrypt only the encrypted second part using the common group encryption and to distribute the decrypted second part to some or all of the UEs of the group, and some or all of the UEs of the group are to decrypt an encrypted first part using their user-specific encryptions.

In accordance with embodiments, for transferring the second part of the certain signaling, the wireless communication network is to establish a group signal radio bearer, gSRB, between the IAB donor and each of the respective UEs.

In accordance with embodiments, the gSRB comprises a first gSRB carrying core network messages to the group, and a second gSRB carrying RAN messages to the group.

In accordance with embodiments, the group SRB comprises or carries one or more of the following:

- a plurality of signal radio bearers, SRBs, to carry RRC group-related signaling, e.g., a first SRB for RRC connection setup, RRC connection reestablishment, RRC connection resumption, a second SRB for RRC messages in connected state, like RRC reconfiguration messages, a third SRB for NAS messages, and a fourth SRB for RRC messages when the UE is dual-connected to two IAB central unit s,
- one of more dedicated logical, transport and physical channels on a downlink to transmit the certain signaling, like a handover-related group signaling or another group signaling from the IAB donor, wherein the data may be scrambled using a radio network temporary identifier, RNTI, like a group-IAB-RNTI,
- the physical downlink shared channel, wherein the group-signaling messages may be send via broadcast to the UEs in the vehicle.

In accordance with embodiments, in case of a handover event, HO,

- the source IAB donor is to send a group-security mode command, like RRC group security, for the group on an interface, like the F1 interface,
- the source IAB donor is to send to the IAB node a HO command, like an RRC HO command, for the group on an interface, like the F1 interface,
- the IAB node is to send the HO command for the group to all UEs of the group,
- the target IAB donor is to perform the UE context setup,
- each UE of the group is to send to the target IAB donor a confirmation of a successful completion of the reconfiguration using a UE specific SRB, and
- the IAB-MT is to perform the handover and the reconfiguration separately, and connect to the target IAB donor.

In accordance with embodiments, the group further includes the IAB-MT of the IAB node, and the IAB-MT is to send a message on behalf of UEs of the group, like a confirmation of a successful completion of a HO, which is normally be sent from each UE.

In accordance with embodiments, the IAB node is a mobile IAB node in a vehicle for serving one or more UEs located in the vehicle, and the IAB node is inactive, when the vehicle is not active, e.g., when a car is not started or a train is not powered, and when the vehicles activated, the IAB mode it to connect the network, and, responsive to a grant of the network access, the IAB node is to advertise network availability to UEs inside the vehicle, e.g., using a SIB or a modified SIB inside the vehicle.

IAB Donor

The present invention provides an integrated access and backhaul, IAB, donor configured for operating in the inventive wireless communication network.

IAB Node

The present invention provides an integrated access and backhaul, IAB, node configured for operating in the inventive wireless communication network.

User Device

The present invention provides a user device, UE, configured for operating in the inventive wireless communication network.

Method

The present invention provides a method for operating the inventive wireless communication network.

Computer Program Product

Embodiments of the first aspect of the present invention provide a computer program product comprising instructions which, when the program is executed by a computer, causes the computer to carry out one or more methods in accordance with the present invention.

Embodiments of the present invention, which are now described in more detail, concern a relay or an IAB-node providing access to all users connected to the relay, like all users within a car (see FIG. 4(*a*)) even for UEs belonging to different MNOs. The embodiments concern an infrastructure sharing case, i.e., sharing the IAB-node where spectrum sharing may also be considered on the access side. On the backhaul side, the spectrum and infrastructure, like the IAB-donor or base station, in the following also referred to as the central unit CU, may be shared or dedicated. The spectrum may be a licensed spectrum or an unlicensed spectrum, where the licensed spectrum may include a spectrum licensed and dedicated to respective MNOs as well as a shared licensed spectrum, for example being locally available at specific premises. Moreover, embodiments provide shared core network, CN, elements, like a shared mobile mobility entity, MME, or a shared access and mobility management function, AMF.

Dedicated Spectrum on the Access Per MNO

In accordance with embodiments, each MNO operates on a dedicated spectrum. From an IAB-node perspective, this may be implemented, for example, using a single physical node housing the one or more DUs which provide radio resource and/or spectrum per MNO using different carrier frequencies. Each UE may be served by using the spectrum of its own MNO to which the UE is subscribed to and which is available simultaneously or sequentially. Stated differently, the IAB-node may simultaneously provide two or more spectra of different MNOs or, in accordance with other embodiments, may provide one or more spectra of different MNOs at a time and at a following time instance provide the spectra of one or more other MNOs In other words, the IAB-node provides several public land mobile networks, PLMNs, and the resource allocation per UE is limited by the spectrum resources allocated to each MNO.

Detection of an Access Signal from the IAB-Node

In accordance with embodiments, the IAB-node provides access for each PLMN separately, and a UE may monitor the reference signal received power, RSRP, or the reference signal received quality, RSRQ, of the signals broadcast by the DU entity of the IAB-node. To avoid frequent cell reselection between an IAB-node and a macro cell, as it may be the case, for example when considering a vehicular scenario, when the user keeps opening and closing the window of the car, in accordance with embodiments, the UE adds a positive bias to the signal strength metrics so as to ensure that the UE connects or stays connected with the IAB-node, i.e., refrains from performing a cell reselection or handover to the macro cell. One reason for providing the bias is that, depending on the path loss, the signals received from the macro cell may be stronger than those provided by the IAB-node because the macro cell transmits signals with an output power that is substantially higher than the output power by which the IAB-node transmits. In accordance with embodiments, the mentioned bias may be selected from a table or list, from a vector or may be IAB-node specific.

Thus, in accordance with embodiments, an appropriate bias is added to a certain cell selection parameter, like the above-mentioned signal strengths, a technique that is also known when managing the load in heterogeneous networks, HetNets. However, in accordance with embodiments of the present invention, for the IAB-node scenario, like a mobile IAB-node scenario, the bias to be added to the measurements performed by the UE for deciding about connecting to the IAB-node or for staying connected to the IAB-node may be dynamic. In accordance with embodiments, the bias may be changed dynamically. For example, it may be defined or determined by the IAB-node and the CU or it may be provided by the operator of the macro cell or the CU. In case the IAB-node and the UE determine the bias, in accordance with embodiments, the IAB-MT may perform the measurements, like the RSRP or RSRQ of the neighboring cells, like cells of other base stations or other IAB nodes, and report the measurement to the CU to which the IAB-MT is connected, e.g., while the UE may be in idle mode. The UE may then be signaled the bias, as is described in more detail with reference to the following embodiments. In accordance with other embodiments, rather than signaling the measurements from the IAB-MT to the CU, the IAB-MT, based on the measurements, may decide that the bias is to be increased or decreased, and the increase/decrease may be signaled to the CU which, in response, changes or modifies the respective one or more cell selection parameter values to be provided to the UE.

FIG. 4(*b*) illustrates a scenario similar to FIG. 4(*a*), namely a car 206 being equipped with a relay or mIAB-node 204 supporting a number of UEs (not illustrated) within the car 206 for connecting via the mIAB-node 204 to a base station or IAB central unit 202. The IAB central unit 202 is assumed to transmit signals with a certain power level, as is indicated at 210. FIG. 4(*b*) further illustrates the mIAB-node coverage 212 without a bias. The coverage 212 may be sufficient when the windows of the car 206 are closed so that the signal 210 experiences a certain attenuation so that a UE in the car 206 judges, using for example the above described procedures, the mIAB-node as the desired node or access point to camp on. However, this may change when the windows are opened so that the signal 210 is less attenuated, i.e., may be stronger than before inside the car. This may cause a UE to select the base station 202 as new access point. To avoid such a situation, the above described dynamic bias is employed and FIG. 4(*b*) also illustrates the mIAB-node coverage 214 with a dynamically adjusted bias. By applying the bias to the measurements or parameters, the UE, despite the fact that the signal 210 may be strong, still judges the mIAB-node as the desired node or access point to camp on.

FIG. 4(*c*) illustrates the change of a boundary for selecting the bases station 202 in FIG. 4(*b*) due to the dynamic bias. FIG. 4(*c*) illustrates the $RSRP_{202}$ of a signal 210 transmitted by the base station 202, and the $RSRP_{204}$ a signal transmitted by the mIAB-node 204. Without the bias, when the signal form the base station 202 is stronger than signal from the mIAB-node 204, the UE judges the base station 202 as the desired node or access point to camp on, instead of the mIAB-node 204 of the car in which the UE is located and moves. Applying the bias moves the boundary 212' without bias to the boundary+bias 214' so that the UE keeps the mIAB-node 204 as the desired node or access point to camp on, instead of the base station.

The mentioned cell selection parameters may be based on those used by the two conventional procedures described, e.g., in TS 38.304, v16.3. sections 5.2.3 and 5.2.4, that characterize the process of selecting a cell to camp on. One is referred to as cell selection and is performed after a UE has switched on and a PLMN has been selected. This process allows the UE to select a suitable cell where to camp on using either stored information or using an initial cell selection procedure. The other one is referred to as cell reselection, which enables the UE to change the cell it has camped on, supporting IDLE mode mobility. Conventionally, cell selection and/or reselection parameters are defined per a cell and are broadcast as a part of system information.

The UE may select a suitable cell using the cell selection parameters and one or more cell selection criteria. The cell selection criteria are fulfilled when the cell selection criteria S is met. For example:

Srxlev>0 AND Squal>0 where:

$$\text{Srxlev}=\text{Qrxlevmeas}-(\text{Qrxlevmin}+\text{Qrxlevminoffset})-\text{Pcompensation}-\text{Qoffsettemp}$$

$$\text{Squal}=\text{Qqualmeas}-(\text{Qqualmin}+\text{Qqualminoffset})-\text{Qoffsettemp}$$

where:

Srxlev Cell selection RX level value (dB)

Squal Cell selection quality value (dB)

Qoffsettemp Offset temporarily applied to a cell for cell selection and re-selection and is temporarily used in case the RRC Connection Establishment fails on the cell as specified in TS 38.331 (dB)

Qrxlevmeas Measured cell RX level value (RSRP)

Qqualmeas Measured cell quality value (RSRQ)

Qrxlevmin Minimum required RX level in the cell (dBm).

Qqualmin Minimum required quality level in the cell (dB). Additionally, if Qqualminoffsetcell is signaled for the concerned cell, this cell specific offset is added to achieve the required minimum quality level in the concerned cell.

Qrxlevminoffset Offset to the signaled Qrxlevmin taken into account in the Srxlev evaluation as a result of a periodic search for a higher priority PLMN while camped normally in visiting PLMN, as specified in TS 23.122.

Qqualminoffset Offset to the signaled Qqualmin taken into account in the Squal evaluation as a result of a periodic search for a higher priority PLMN while camped normally in visiting PLMN, as specified in TS 23.122.

Pcompensation Parameter related to the UE TX power level, and specified on p. 20, TS 38.304, v16.3.

The UE may perform a cell reselection using the cell reselection parameters and criteria. The reselection may be based upon cell level and beam level measurements. When the gNB transmits multiple beams, a UE is required to generate a cell level measurement from one or more beam level measurements. The cell reselection uses the RSRP metric for beam/cell measurement to rank cells, but may also include e.g. RSRQ, SINR, interference threshold or a combination of such metrics. For example, a cell-ranking criterion Rs for the serving cell and a cell-ranking criterion Rn for one or more neighboring cells may defined by as follows:

$$Rs = \text{Qmeas},s + \text{Qhyst} - \text{Qoffsettemp}$$

$$Rn = \text{Qmeas},n - \text{Qoffset} - \text{Qoffsettemp}$$

where:

Qmeas RSRP measurement quantity used for cell reselections

Qoffset Offset between the two cells, serving and neighboring, as specified in TS 38.304

Qoffsettemp Offset temporarily applied to a cell as specified in TS 38.331

Qhyst Hysteresis value for ranking criteria (dB)

The UE performs ranking of all cells that fulfil the cell selection criterion S. The cells are ranked according to the R criteria specified above by deriving Qmeas,n and Qmeas,s and calculating the R values using averaged RSRP results. These parameters are broadcast in respective SIBs.

In accordance with embodiments, the IAB-MT of the IAB-node is in connected mode, i.e., the backhaul connection is active, which means that it measures and reports its measurements of its neighboring cells to the IAB-donor. The measurement results normally include all the neighboring cells. These cells are also typically the neighbors for the UEs that are within a vehicle, like a car, a train or a bus. As the mIAB-node moves, its and UEs' neighbors are changing and their signal strength is different, which means that the bias on the access side of the mIAB node, e.g. for the cell selection/reselection purpose, may need to be adjusted. For example, the neighboring cells may have strong signal, e.g., RSRP, so the bias may need to be increased to enable UEs to still select the mIAB node to camp on instead of a neighboring cell in case a user opens a window, or simply to avoid back and forth cell reselection.

In accordance with embodiments, the new cell selection criteria may be written as follows:

$$\text{Srxlev} = \text{Qrxlevmeas} + \text{Qbiasrx} - (\text{Qrxlevmin} + \text{Qrxlevminoffset}) - \text{Pcompensation} - \text{Qoffsettemp}$$

$$\text{Squal} = \text{Qqualmeas} + \text{Qbiasqual} - (\text{Qqualmin} + \text{Qqualminoffset}) - \text{Qoffsettemp}$$

where

Qbiasrx Bias value in dB applied for the RSRP value

Qbiasqual Bias value in dB applied for the RSRQ value

Qbiasrx and Qbiasqual are dynamic and may take a range of values (negative, 0, positive). While the existing Qqualminoffsetcell may be used to adjust the signal quality for the mIAB cell, this cell specific offset is only applicable to Squal cell selection parameter. Introducing new bias parameters for both Srxlev and Squal provides greater flexibility in influencing the cell selection process for mIAB cell.

With regard to cell reselection for the UEs within the car, the cell-ranking criterion Rs and Rn described above may be changed dynamically for serving and neighboring cells, based on the mIAB-MT measurements, and may use a range of values (existing or extended) of the (already defined) parameters Qoffset and Qhyst to optimize the cell reselection process.

The UE may measure the attributes of the serving and neighboring cells to facilitate the cell reselection process. The cell reselection may use the RSRP metric for beam/cell measurement to rank cells, but may also include, e.g., RSRQ, SINR or a combination of such metrics. More generally, the cell reselection process may be based on one or more of the following non-limiting metrics:

RSRP, RSRQ, SINR, SNR, power measured over other control channels, e.g., synchronization sequences such as SSBs, a capacity or supported data rate of a target cell, a delay or jitter of a target cell, as IAB nodes connected via multiple hops may aggregate delay on the backhaul, the UE might favor a target cell with less hops to the a central unit, CU.

In accordance with the embodiments described so far, the dynamic bias is determined by the IAB-node. In accordance with further embodiments, the dynamic bias may be determined by one or more of: the IAB node, the IAB donor central unit, the core network, CN, another UE.

For example, the IAB-donor may make changes to the bias based on the measurement reports, MRs, provided by the IAB-MT. The IAB-donor may combine the MRs and the IAB-donor's previously used cell selection parameters for the considered mIAB-DU. The IAB-donor may also change the bias based on, e.g., a load on or a failure of one or more links in the backhaul network. The mIAB node, more specifically its access part, the IAB-DU, may signal to the IAB-donor, e.g., its high load, which prompts the IAB-donor to change the bias parameters. The mIAB-DU, based on, e.g., a high load situation, may adjust the bias by itself by some value from a predefined, ordered set, and send a configuration update message including the updated bias value or the delta between the current value and the new value to the IAB-donor.

In accordance with the embodiments described so far, the dynamic bias is determined by the IAB-node or another one of the above mentioned entities. In accordance with further embodiments, the dynamic bias being selected by the mentioned entities from a list or set of bias values. The list or set of bias values may be predefined or configured and depends, e.g., on the type of UE, on a service type, etc. In case the UE is configured or preconfigured with the list, a change of the bias may be signaled by a pointer to a certain entry in the list and the UE chooses the new bias value. The UE may select using the bias dependent on, e.g., the type of traffic. For example, the UE connects to the mIAB node in the car for URLLC traffic, but for best effort traffic, it is acceptable to connect to the outer gNB, or vice versa.

In accordance with the embodiments described so far, the bias may be calculated/adjusted based on measurement reports from UEs and/or signal measurements of the IAB donor or base station. The bias is then signaled to UE. Rather than signaling the bias itself, dependent on the bias determined, the UE may be provided simply with a signaling indicating that a bias value configured or preconfigured in the UE is to raised or lowered by a certain value or step size, like ±3 dB. The value may also depend on the number of UEs attached to mIAB-node and may be adjusted accordingly. For example, the load on the mIAB-DU, that is the number of UEs that are connected to the mIAB node may be high or reaching a predefined threshold, which is typically a part of the node's admission control mechanism. Such a situation may trigger the mIAB node (mIAB-DU) to adjust the bias to limit the number of users camping on the cell and, consequently, connecting to the mIAB node. Also, this may be the case when the mIAB node has a limited backhaul capacity or data rate, or has a backhaul delay which may not support the requested QoS by the associated UEs. Therefore, the mIAB node may have the intention to reduce the number of associated nodes, supporting the request QoS for all associated UEs. This may be more likely fulfilled with a lesser number of associated UEs.

In accordance with embodiments, the mIAB-node may provide one bias value for all UEs in its coverage. In accordance with other embodiments, since each UE may have a unique path-loss or measured RSRP from the mIAB-node, the mIAB-node may provide different bias values for the ranges of path-loss values, so to address respective groups of UEs in its coverage.

Signaling of IAB-Cell Specific Aspects

In accordance with embodiments, specific parameters associated with the IAB-node or the IAB-cell may be signaled using a system information block, SIB, for example when the UE is in RRC idle mode or in RRC connected mode, or during a random access channel, RACH procedure. For example, the IAB-cell specific aspects may include the above-described bias to be applied to the measurements associated with certain cell selection/reselection parameters.

In accordance with embodiments, the dynamic bias may be signaled using SIB1. For example, the cell selection information may include an additional flag to indicate whether the entity sending the SIB is an IAB-node, like a mobile IAB-node, also referred as mIAB-node. The flag may be a pointer to additional fields in the SIB1 which may indicate the value of the bias and, optionally, other delta cell selection parameters to be signaled to the UEs. SIB1 includes information regarding, e.g., random access parameters, the availability and scheduling of other SIBs, periodicity, cell access barring and the like. SIB1 is cell-specific. Below is an example of parameters signaled through SIB1. Some of them may also be signaled in other SIBs e.g. in SIB4 for neighbor, inter-frequency cell reselection. The example illustrates existing and additional cell selection parameters in SIB 1:

```
. . .
SIB1 : := SEQUENCE {
 cellSelectionInfo SEQUENCE {
  q-RxLevMin,
  q-RxLevMinOffset INTEGER (1. . 8)        OPTIONAL, -- Need S
  q-RxLevMinSUL Q-RxLevMin               OPTIONAL, -- Need R
  q-QualMin                         OPTIONAL,-- Need S
  q-QualMinOffset INTEGER (1. . 8)  OPTIONAL -- Need S
  Qbiasrx INTEGER (1. . sizeOfList)     OPTIONA - Cond mIAB
  Qbiasqual INTEGER (1 .. sizeOfList)   OPTIONAL - Cond mIAB
```

-continued

```
} OPTIONAL, -- Cond Standalone
. . .
 cellAccess RelatedInfo,
 connEstFailureControl      OPTIONAL, -- Need R
 si-SchedulingInfo                  OPTIONAL, -- Need R
 servingCellConfigCommon ServingCellConfigCommonSIB OPTIONAL,
 -- Need R
. . .
 mIAB-r18 ENUMERATED {true} OPTIONAL, -- Need N
. . .
}
```

In accordance with other embodiments, the signaling may be done using SIB2, SIB3, SIB4, or other appropriate SIB. For example, SIB2 contains mainly cell re-selection information for the serving cell, but it may also contain common parameters for all cells, like serving cells and neighboring cells. SIB3 contains specific neighbor cell related information, like intra-frequency cell reselection parameters. SIB4 contains neighbor information relevant only for inter-frequency cell reselection.

In accordance with other embodiments, the signaling may be done using SIB3 for neighboring intra-frequency cells which may include an additional flag. For example, in a specific area, the one or more macro cells may introduce into the existing signal information blocks, like the SIB3, an additional flag which, if set or enabled, points to cell-specific parameters for neighboring cells, like the IAB-nodes. Responsive to receiving the SIB3, a UE may select an IAB-node, for example in case the IAB-cell is ranked as first according the adopted signal strength or quality metrics for a certain period of time, i.e., in case the measurements of the cell reselection parameters to which the dynamic bias is added is higher than an associated value provided by a macro cell for a certain period of time. In accordance with other embodiments, the IAB-node may be selected when it is determined that a relationship between the IAB-node and the UE is quasi-static or at least not changing too much in path loss, i.e., a fluctuation in path loss is between predefined limits, a scenario that may be encountered when connecting to a relay located in a car, as explained above with reference to FIG. 4(*a*). Furthermore, in addition to the above discussed dynamic bias that may be applied for cell reselection, in accordance with embodiments, what may be signaled to the UE in e.g. SIB2 is analogous to the speed dependent ScalingFactor for a hysteresis, which specifies a scaling factor for the Qhyst parameter, which is used in a cell ranking criteria. In the current specifications, scaling factor values depend if a UE is in medium or high-speed mode. In accordance with embodiments, a ScalingFactor_mIAB may be specified in SIB2 and represents the additional hysteresis to be applied, which applies to all moving mIAB cells under a certain condition that a UE detects. In other words, in this case, the UE detects that it is camping on a moving mIAB cell. For example, the UE may detect that it has changed the location, but the path-loss values remain within a small interval and/or the cell it camps on has not changed. In that case, the mIAB cell reselection parameters may include the following:

```
mIAB_ReselectionPars SEQUENCE {
relativeMobilityStateParameters
  q-Hyst_mIAB SF SEQUENCE {
    sf_mIAB ENUMERATED {dB-x1, dB-x2, . . .},
    }
```

RelativeMobilityStateParameters contains parameters to determine the UE mobility state relative to the moving mIAB cell. This Information Element may contain the fields such as:

t-relativeMobilityEvaluation ENUMERATED {sx1, sx2, . . . }, t-hyst_exitRelMob ENUMERATED {sy1, sy2,}, locationChange ENUMERATED {z1, z2, . . . } n-CellChangeLow INTEGER (0, . . . x), where t-relativeMobilityEvaluation represents a duration in, for example, seconds for evaluating criteria to determine if the UE has entered this relative mobility state.

t-hyst_exitRelMob represents the additional a duration, also in seconds, for evaluating criteria to exit the relative mobility state and enter normal mobility state. For the location change, the UE may record a change in longitude or latitude by calculating it, for example, from its own geographic coordinates.

locationChange may be specified in e.g. degrees and may include a range of values that indicate a minimum required change in longitude or latitude during the evaluation period.

RelativeMobilityStateParameters may also include parameters that point to the frequency of cell changes (similar to the existing parameters in SIB2 for the mobility state).

n-CellChangeLow is expected to have a limited range with a low maximum value, indicating there may be only a low number of instances when a cell changes during the evaluation period.

The UE may also determine location change based on the information provided through system information by an IAB node, as configured by an IAB donor, whereby signaling provides, e.g. the GPS position of the IAB node. This may be compared by the UE to its own position, if this is available for the given UE. Thus, the UE may compare and calculate the difference of the position of the IAB node and its own, and thus derive from this relative mobility state parameters by comparing the difference to a pre-configured threshold.

In accordance with yet other embodiments, when implementing the signaling of the IAB-node specifics during the RACH procedure, when the UE starts from the idle state, the RACH procedure is initiated and it is to be decided whether further access is to be made to a macro gNB or to the IAB-node, like the mobile IAB-node in FIG. 4(*a*). The decision may be made by the IAB-donor and/or the IAB central unit, for example on the basis of a knowledge of the coverage in the area, the load, the type of IAB-node, for example whether it is on a car, on a train, or on an bus or ship or the like. Stated differently, the IAB donor and/or the IAB central unit may decide that the UE is to further access the wireless communication network via the IAB node dependent on one or more criteria or features of the UE and/or the IAB node, like a coverage in the area, a load, a type of the IAB-node. The decision may also be based on the ID of the UE, a feature set or a configuration of the UE. Regarding the features of the UE and/or the IAB node, for example, a power saving UE is better connected to the mIAB node within vicinity, so that it may transmit with less power in the UL, and a mIAB-node may consider the scenario or setup of the surrounding cellular system.

In accordance with other embodiments, the selection may also be UE-based. In accordance with other embodiments, the IAB-node may signal to the UE coming from the idle state, for example during the PRACH in Msg2, that it is an IAB-node, like a mobile IAB-node, so that the UE may decide to continue the PRACH with this node or not. In accordance with other embodiments, this may also be applied to the two-step RACH procedure. During the mentioned RACH procedure, in case of determining that the UE is to connect to the IAB-node, the IAB-cell specific parameters may be provided to the UE in the above-mentioned RACH messages provided by the IAB-node to the UE. The UE may be configured so that in case it receives in the PRACH response a flag or indication that this is an IAB node, it proceeds or aborts the connection setup. Furthermore, the UE may be configured to decide to proceed or abort connection setup, based on the PRACH response and/or a change in a parameter it measures, e.g., a path-loss change. For example, if the path-loss is larger than a threshold, the UE may be not within close vicinity of the mIAB node, and thus not within the same vehicle. Thus, it connects to a different mIAB node or to a gNB. Other criteria may be the UE's position, the GPS coordinates, a velocity, a channel variation, a class, e.g., if it is a P-UE while a fixed installed IoT UE does not connect to a mIAB node.

Discovery of IAB-Nodes by a UE

In accordance with embodiments, for a UE to find out whether a certain IAB-node is the one the UE wishes to connect to or stay connected to, the IAB-node may signal its position, like a geographical location, for example a GPS position, and the UE may compare this position with its own position. In case the UE determines to be within reach of the IAB-node, in accordance with embodiments, the UE may determine that it is within a certain area or vehicle in which the IAB-node is installed and initiate the connection to the IAB-node. The distance may also be judged based on the cell IDs of the UE and IAB node, or based on an analysis of a wireless channel between the UE and IAB node, e.g., using time and frequency selectivity of the channel. The information about the positions may also be obtained by the UE indirectly from the CU, for example when asking for information on the cell ID of an IAB-node, and the CU may provide a list of IAB-cell-IDs and positions to the UE.

Handling of a UE being in Connected-Mode with an IAB-Node

The above analogy explained for the cell selection/reselection process may also be used for specifying the UE behavior in connected mode. In other words, the above-mentioned aspects, like the bias, may be employed when the UE is in connected mode, so as to decide whether to stay connected to the IAB-node or not. In such a scenario, the UE and the IAB-MT are both in connected mode, and in accordance with embodiments the hysteresis and thresholds for deciding whether a connection to the cell of the IAB-node is to be maintained, may be changed dynamically and determined by the IAB-node and the UE or by the UE alone, in a similar way as described above with reference to the cell selection/reselection process. For example, also in such a case, the UE measurements are reported to the CU, which governs the handover procedure.

In accordance with embodiments, in case the UE is connected to the network via the IAB-node, the sending of mobility measurements is desired to be reduced, and in accordance with embodiments, the UE is configured, for example via the network, to perform and report measurements only after a certain event, such as the A2 event or another event known in the art. The A2 event is defined as a situation in which the serving becomes worse than a threshold and, normally, does not invoke the measurements but a handover. In accordance with embodiments, the event may be defined with additional hysteresis and thresholds specifically configured for the IAB-nodes as follows:

$$Ms+Hys+OffsetHys_{mIAB}<Thresh+OffsetThresh_{mIAB}$$ (Trigger Condition).

with:

Ms the measurement result of the serving cell without taking any offsets into account. Ms may be expressed in dBm in case of RSRP, or in dB in case of RSRQ and RS-SINR Hys the (original) hysteresis parameter for this (A2) event (i.e. hysteresis as defined within reportConfigNR for this event). It is given in dB.

$OffsetHys_{mIAB}$ the additional offset for hysteresis, applied only for mIAB node, given in dB.

Thresh the (original) threshold parameter for this (A2) event. Measured in the same units as Ms.

$OffsetThresh_{mIAB}$ the additional offset for the threshold parameter, applied only for mIAB node, given in dB.

The UE, in accordance with embodiments, may be configured, for example via the network, to perform the handover, HO, after an event is detected such as a modified A2 event, using the hysteresis and threshold specifically configured for the mIAB-node. In accordance with embodiments, the dynamic offsets for hysteresis and thresholds may be changed by the IAB-donor as follows:

- the IAB-donor makes changes based on the measurement reports, MRs, by the UE and/or the mIAB-MT, and/or
- the IAB-donor makes changes based on the condition of the backhaul network, e.g., based on a load of or a failure of one or more links in the backhaul network, and/or
- the mIAB node, like its access part, the IAB-DU, signals to the IAB-donor a certain condition, like a high load, i.e., a load exceeding a certain threshold, which prompts the IAB-donor to make changes to the parameters related to handover (threshold and/or hysteresis, and/or offsets
- the mIAB-DU, based on a certain condition, like a high load, i.e., a load exceeding a certain threshold, adjusts the threshold and/or hysteresis and/or offset by some value, e.g., a value selected from a predefined, ordered set, and then sends a configuration update message to the IAB-donor. The IAB-donor may acknowledges this by sending an acknowledgment message.

In accordance with embodiments, the dynamic offsets for threshold and hysteresis may be changed by the IAB-node based on one or more of the following:

- The surrounding cells, e.g., by adapting the offsets so that the UEs stay connected also in case the surrounding cells, like cells of one or more other IAB nodes or base stations, transmitting at a power exceeding a certain level. The IAB-node may adapt the threshold depending on the surrounding cells, e.g., if the vehicle including the IAB-node drives into an area with gNB having very strong power levels, and it wants to keep its UEs associated with the IAB-node.
- A number of UEs connected to the IAB node, e.g., by adapting the threshold or hysteresis so that a certain number of UEs are gradually disconnected. Thus, if too many UEs connect to the mIAB-node, e.g., a number of connected UEs exceeds a threshold, the mIAB-node may be desired to gradually handoff some of its UEs.
- A vehicle carrying a mobile IAB node is stopping, e.g., by adapting the threshold or hysteresis through offsets so that the UEs is handed over to another IAB node or base station outside the vehicle. This is similar to reducing the number of UEs connected but it is not triggered due to the number of connected UEs exceeding a threshold but due to the vehicle including the mIAB-node stopping so that the UEs are to be handed over to a gNB outside the car. Doing this handoff gradually avoids that all UEs have to perform the HO at the same time, which may be too much burden to the control channel of the gNB outside the vehicle Announcement of IAB-Nodes Available in a Macro Cell In accordance with a further embodiment, the wireless communication network, for example the CU of an IAB node or a base station or the core network may provide a list of IAB-nodes for all UEs already connected to or camping at an IAB-node.

In accordance with embodiments, the list may be a mobile IAB-approved cell list. For example, when the wireless communication network comprises a plurality of, i.e., two or more wireless communication networks operated by respective mobile network operators, MNOs, the list may include one or more mobile IAB nodes allowing access by UEs subscribed to a wireless communication network that is the same of different from the wireless communication network to which the mobile IAB node is subscribed, e.g., based on a roaming agreement and the like. For example, the list may be used for HO decisions, e.g., for load balancing, or the CN may provide updates to a service or a profile, based on a user's proximity or connection to mIAB cells.

In addition, the RAN may configure a UE to report that it is entering or leaving a proximity of one or more cells included in the mIAB-approved cell list, which may be similar to Closed Access Groups.

A list may be provided to the UEs via the active IAB-node or via the macro cell base station or it may be relayed from an IAB-node or a macro base station via a sidelink. In the latter case, a first UE, like UE-A may signal via the sidelink to a second UE, like UE-B, that it is currently connected to an IAB-node or to a base station. Dependent on its distance, which is determined using, e.g., a physical distance in meters or a path loss, a RSRP, or a minim required communication range, MRCR, UE-B may decide to handover to the same IAB-node, i.e., the IAB-node to which UE-A is connected. UE-A may transmit the primary cell ID, PCID, of its current connection and/or some other identifier to the UE-B. In accordance with further embodiments, additional information may be added, for example in case of a mobile IAB, a speed at which the IAB-node moves, history data on a location of the IAB-node and the like. Based on such additional information, UE-B may evaluate whether it is moving into the same direction, for example, for determining whether it is located within the same vehicle as UE-A.

In accordance with other embodiments, in case a UE that is currently associated with a certain IAB-node leaves the environment covered by the IAB-node, for example the vehicle in case of a mIAB-node, the IAB-node may trigger a non-access stratum, NAS, registration update for the UE directly or, in accordance with other embodiments, provide the UE with information about a current tracking area so that the UE may perform the handover to the new cell faster. The new cell may be a normal or regular gNB, i.e., no IAB, or a new mIAB-node with a different PCID. The new mIAB-node may be a node that provides a better service for the given UE, e.g., it may have more transmit power or a better backhaul connectivity. The tracking area may be defined by the above-mentioned list of IAB-nodes.

In accordance with yet further embodiments, the IAB-node may also trigger the CU of the IAB-donor to forward the UE context to the new cell. This may be beneficial in case the IAB-node is a mobile node associated with a vehicle which is deactivated or just starting to be deceived, like a car being switched off or starting to park. In this case, the IAB-node has a knowledge that UEs connected to it are likely to change their connectivity within a certain period of time.

Shared Spectrum on the Access

In accordance with further embodiments, the wireless access from the users to the small cell inside the environment, as provided by the IAB-node, may be realized using a shared spectrum for the access link. For example, inside the area covered by the IAB-node, for example inside a moving confinement in case of a mobile IAB, like a car, a bus, a train, a ship or the like, the wireless access from the passengers to the small cell inside the vehicle may be realized using a shared spectrum for the access link. This means that, other than in a conventional macro cell setup, where UEs use a dedicated spectrum provided by the MNO to which they are subscribed, UEs may use the same spectrum independent of their MNO. In accordance with embodiments, using the shared spectrum may be realized in various ways including an aggregation of a spectrum of multiple MNOs or allowing users to enter a service via the spectrum of an MNO to which they are not subscribed.

Spectrum and Local Infrastructure Sharing

In accordance with embodiments, the local infrastructure, namely the IAB-node, more specifically its DU entity, may be shared between different MNOs, for example, the UEs depicted in FIG. 4(*a*), may be subscribed to different MNOs, however, the infrastructure, like the spectrum, provided by the IAB-node is shared by all the UEs inside the car. In accordance with embodiments, inside the car a single or a few selected PLMNs of MNOs are announced by the DU entity of the IAB-node, i.e., it is indicated to the UEs that one of few selected mobile networks are available for access. For example, it may be assumed that the UEs' MNOs have a roaming agreement or some other special agreement in place with the MNO providing the spectrum offered by the mIAB-node, and the UEs may read a list of allowed mIAB cells, like the above described approved cell list.

In accordance with embodiments, the spectrum of a single operator may be used. In accordance with such embodiments, all UEs subscribed to the announced network, PLMN, get local spectrum access granted by their native network via the DU entity inside the IAB-node, like the mIAB-node inside the car. All other UEs which are not subscribed to the announced network, PLMN, may obtain local spectrum access to the host network via the DU entity inside the car. In case of the availability of the home network, a UE, usually, does not search and try to access the network of another operator, so that UEs which are not subscribed to the network announced by the IAB-node but are within reach of a macro cell of the operator to which they are subscribed, are not expected to access the IAB-node via the announced network from a different MNO.

Therefore, to enable a UE, like UE2 in FIG. 4(*a*), to also access the IAB-node, for example the one inside the car, embodiments provide for an additional triggering condition or procedure for facilitating an automatic or semi-automatic attachment to the local small cell provided by the DU entity of the IAB-node. In accordance with embodiments, such a mechanism may be a piece of software inside the UE, like a mobile phone. The piece of software or, more generally speaking, the software, may be provided by the operating system running on the UE or it may be loaded by a user of the UE as an application, like an app. The software may initiate a reconfiguration of the network selection preferences, for example in case of external triggers. Such external triggers may be a service set identifier, SSID, as it may be provided by a WiFi access point, AP, located inside the environment where the users are located, for example, inside a car, a train or a ship or any other kind of vehicle also including airplanes. In accordance with other embodiments, a particular Bluetooth low energy, BLE, beacon or a scan of a QR code provided inside the environment or, in case of a vehicle, an interface provided by the onboard unit, OBU, via a cable or BLE may provide for the triggering of the reconfiguration of the network selection preferences. Responsive to the reconfiguration of the network selection preferences, the UE which is not subscribed to the network announced by the IAB-node, may start a cell selection process for connecting to the IAB-node despite the fact that that it may still be within reach of its own network, also referred to as the home network. In accordance with yet other embodiments, a home network operator may offer a profile to the UE that is preconfigured for local and temporary roaming in other networks even within the network coverage of the UEs own network.

Responsive to the external trigger or to being provided with the just-mentioned profile, in accordance with embodiments, a UE not being subscribed to the network announced by the IAB-node, may trigger a cell search in the spectrum of any other MNO, for example in case a certain velocity or attenuation with respect to the stationary base stations of the home network of the UE is observed. For example, in case of a mobile environment, the UE may determine that it is moving rapidly with respect to a base station or to a set of base stations of its home network so that it judges that it is located within a moving vehicle and thereby, responsive to the external trigger or the profile, initiates the procedure allowing the connection to other MNOs which, eventually, allows the UE to access the IAB-node via the announced network, despite the fact that the network is not the UE's home network.

In accordance with other embodiments, the cell search may be requested, triggered, granted or authorized by the base station serving the UE, responsive to the UE sending a request to the home network. For example, the UE may request local roaming using an alternative access point, AP, like a DU entity of an IAB-node or a CU entity of an IAB-donor of a MNO different from the one to which the UE is subscribed, when the AP is in close vicinity, for example within a predefined communication range, and when the UE has a low mobility relative to the AP, i.e., the relative movement of the UE with respect to the alternative AP is lower or quasi stationary when compared to the UE's mobility relative to a base station of the UE's home network. The request for local roaming may include the home network and/or the host network and also a predefined dynamic and/or demand or negotiated roaming grants or agreements or change of UE identities, like multiple SIMs, may be involved.

In accordance with yet other embodiments, a multi-operator spectrum may be pooled. In accordance with such embodiments the DU entity of the IAB-node may announce two or more PLMNs and provide access to the UE subscribed to the announced networks, while other UEs not being subscribed to the announced networks may access the IAB-node in case they have a roaming agreement with the announced MNOs. For an efficient use of the spectrum inside the environment, like inside the car, and for the use of low power, in accordance with embodiments, the spectrum of the two or more MNOs may be a pooled spectrum being shared and provided to all UEs. This is advantageous as it allows for a higher band allocation per UE for either higher throughput and/or for a more energy efficient transmission by allocating more spectrum and a lower modulation scheme for reduced spectra and increased energy efficient transmission mode selection. This embodiment may be referred to as a MOCN type operation in accordance with which operators use the same (pooled) radio resources. In the conventional situation, a base station broadcasts in the SIB1 a single cell global ID, CGI, but has different PLMN IDs associated with it. The MOCN traffic associated with each PLMN is handled by a separate core network. In accordance with the embodiments described above, in the IAB-node relaying case, separate connections to the different core networks of the MNOs are provided.

In accordance with other embodiments, instead of the concurrent announcement of two or more PLMNs, the IAB node may identify itself as a node being multi-PLMN-capable in several bands and announce the different PLMNs in regular intervals or in some or all of channels/bands used by the IAB-node.

Shared Spectrum Usage in Unlicensed Bands

In accordance with other embodiments, the IAB-node may provide a shared spectrum usage in one or more unlicensed bands with a cellular radio access technology, RAT, as it is for example used in NR-Unlicensed or NR-U. In accordance with such embodiments, one or more PLMNs may be announced with the IAB-node, more specifically the respective spectra thereof in the unlicensed spectrum may be announced, while the IAB-node may offer the backhaul to the respective core networks of the MNOs. In accordance with such embodiments, instead of using a dedicated spectrum allocated to the respective MNOs the IAB-node inside the specific environment, like inside the car or another vehicle, may provide channels in the unlicensed bands which, by default, are accessible by all UEs capable of using the unlicensed bands. In accordance with embodiments, although the wireless spectrum access in the unlicensed bands is available to all UEs, for example using NR-U, an authentication mechanism as described above with reference to the single operator spectrum usage or the multi-operator spectrum pooling may be implemented. This is advantageous as it allows the UE to automatically scan for available NR-U bands despite the fact that it is still within coverage of its home network, thereby reducing the need to receive a signaling to scan other dedicated bands for other MNOs. In accordance with another embodiment, the NR-U access or, more generally speaking, the access via the unlicensed spectrum, may be used as a fallback mechanism, in case a UE may not connect via its own MNO or via a shared spectrum or shared frequency band, for example in case of a roaming situation.

In accordance with embodiments, different PLMN-IDs associated with the different networks are provided, similar as in the above-mentioned MOCN solution. The PLMN-IDs may be broadcast in SIB1, and all UEs supporting NR-U and whose PLMN is broadcast in SIB1 may use the IAB-node, like the mIAB-DU, an access node. Thus, UEs may be allowed to not only operate in a regular NR-U as provided in the spectrum of their operator, but also in the NR-U spectrum of other networks.

Embodiments using the unlicensed spectrum for the wireless access inside the environment are advantageous especially in case the IAB-node to be accessed is located inside a vehicle, like a car, because the original equipment manufacturers, OEMs, of the vehicle have to ensure that the wireless equipment is in conformity with the regulations in all countries the vehicle may be sold to and operated in. Therefore, using the unlicensed spectrum is advantageous as when crossing borders no negotiation of spectrum usage is needed a priori or in demand or on the fly. A further advantage is that only the MT unit in the IAB-node needs a SIM card or another identification, allowing access to the network via a advantageous MNO partner, for example by means of the subscription via the SIM, or by means of roaming.

Single MNO DU Combined with Layer 3 Relaying

In accordance with yet other embodiments, a single MNO IAB-node may be combined with Layer 3 relaying using, for example, WiFi inside the environment where the IAB-node is placed, like inside a car. The wireless access inside the environment or vehicle may be provided by using another radio access technology, RAT, which is capable of using the unlicensed spectrum, for example, WiFi. In such an embodiment, additionally to the IAB-node providing the spectrum of one or more MNOs as described above, the IAB-node may provide, e.g., via one of its DU entities, a spectrum in one or more unlicensed bands, like a WiFi spectrum, so as to provide an access point, like a non-3GPP access point, for accessing one or more services, like the Internet, via an IAB distribution unit, IAB-DU, of the IAB node. Such embodiments are advantageous as UEs, which may not access the spectrum or network announced by the IAB-node, may still be provided with services, like phone services via the WiFi access point, if such service is provided by the home operator within the coverage area of the home network. The UE may access the one or more services via the unlicensed band responsive to receiving from the IAB-MT or the IAB-DU a signaling indicating the one or more unlicensed bands or responsive to the UE having scanned the spectrum for the one or more unlicensed bands.

The WiFi call establishment of the UE to its home network, in accordance with embodiments, may be used as a secure connection, for example by VPN, for additional on the fly or on demand negotiations or authentications between the home network MNO and the host network MNO terminating each at the same UE via the same backhaul link. This allows for a multifactor authorization. In accordance with embodiments, such a mechanism may include that the networks exchange parameters and/or handshakes between the core networks and additionally via the same UE in order to make sure that the correct entity is authorized.

An advantage of this embodiment is the fact that WiFi access points are already found in many environments, like in many cars, allowing to adopt the hybrid approach in accordance with the described embodiment easily by simply extending the existing WiFi routers towards more tightly integrated access points providing a hybrid wireless access scheme inside the environment and using the WiFi as a general purpose internet access. In accordance with further embodiments, the WiFi access point may be coordinated by the CU using existing frameworks of LTE-WLAN Aggregation, LWA, License-Assisted Access. LAA, New Radio Unlicensed, NR-U, Long Term Evolution-Unlicensed, LTE-U, or MulteFire.

Local Authentication

In the above-described embodiments, for making a connection to the IAB-node and/or for using a backhaul connection via an IAB-MT of the IAB-node, the UE may be required to perform a local authentication towards the DU entity of the IAB-node or towards the CU entity of the IAB-donor, for example in case a UE is located inside a vehicle. In accordance with embodiments, the authentication of a UE inside a vehicle or any other environment which is covered by the cell defined by the IAB-node, may include one or more of the following:

- a reading of a QR code from a location in the environment, like from the inside of a vehicle,
- exploiting a proximity detection, for example, using near field communication, NFC,
- pairing with a central unit, like an onboard unit of a vehicle, using, e.g., a wireless connection, like a BLE connection, for example in away similar to a hands free pairing between a mobile phone and an onboard unit of a vehicle where the user has to confirm a number code on its phone, which is displayed and, therefore, is only available on demand when the card is active,
- use of an authentication mechanism similar to a BLE handshake between mobile phones, like the iPhone Airdrop, in accordance with which the authentication between two WiFi nodes in direct mode is initiated and handshake via BLE,
- routing or forwarding or relaying an authentication procedure via an onboard unit of the vehicle having a certified relationship to a local IAB-node,
- use of an authentication token provided by another UE, for example a first UE already connected to the IAB-node may provide to a second UE a token via the sidelink—the first UE may send authentication information using a push notification, similar as is it exchanged on smartphones to neighboring smartphones for getting Wireless Encryption Protocol, WEP, keys in today's WiFi networks.

In the above-described embodiments, allowing access to the IAB-node on a dedicated spectrum per MNO or on a shared spectrum, the IAB-node also provides for the backhaul connection to the respective MNOs, either via a dedicated backhaul or via a shared backhaul.

Dedicated Backhaul

Figure 6:
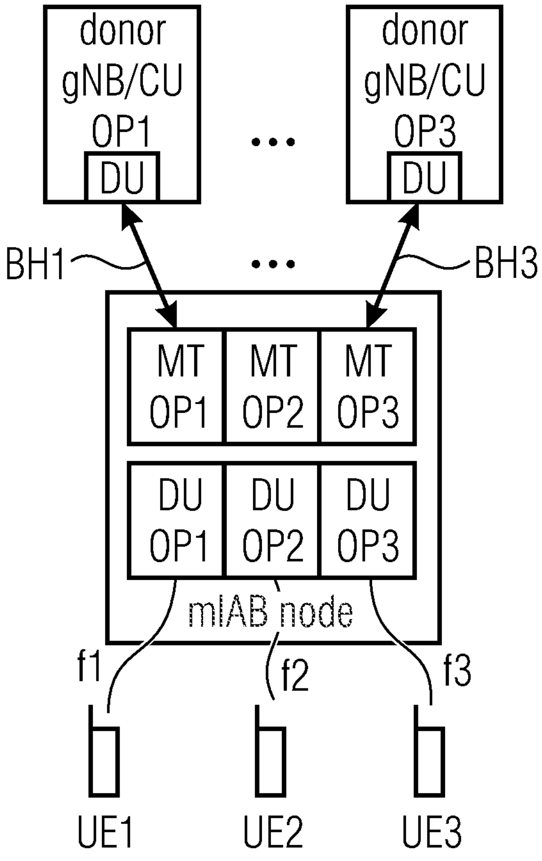
FIG. 6 illustrates a mobile IAB-node implementation using a plurality of DU entities, MT entities and dedicated backhaul connections in accordance with embodiments of the present invention.

In accordance with embodiments, the IAB-node may provide a dedicated backhaul, i.e., the backhaul from the IAB-node branches out to individual IAB-donors. FIG. 6 illustrates an embodiment of a mobile IAB-node, mIAB-node, implementation using a plurality of DU entities, MT entities and dedicated backhaul connections. The mIAB-node, in the depicted embodiment, is assumed to have three DU entities DU_OP1, DU_OP2, DU_OP3 associated with respective different MNOs or operators OP1, OP2, OP3. The mIAB-node announces three spectra on carrier frequencies f1, f2, f3 that may be used by UE1, UE2 and UE3, respectively. The spectra f1-f3 are associated with the respective network operators OP1, OP2 and OP3 to which the UEs are subscribed. Further, the mIAB-node provides a plurality of MT units MT_OP1, MT_OP2, MT_OP3 each associated with one of the operators OP1, OP2, OP3 and allowing for a connection to an IAB-donor, also referred to as an anchor donor, belonging to the respective operator. In FIG. 6, the respective MT units associated with operators OP1 to OP3 provide for the respective backhaul connections BH1 to BH3 to the IAB donors of OP1, OP2 and OP3. Thus, in the scenario depicted in FIG. 6, each operator connects to its own IAB-donor, as is conventionally the case.

In accordance with other embodiments, the MT units of the IAB-node may optimize the backhaul link to be used, for example, according to certain criteria defined by the associated MNOs, and a backhaul connection for connecting the MIB-node to the respective donor may be selected. For example, URLLC data requires a low delay or a low jitter, and if the mIAB node is connected via several hops to a CU, this may be too large for a certain quota of URLLC data. In accordance with embodiments, the IAB-node may decide to cut or add backhaul connections so as to match the backhaul capacity and/or the delay goal of the associated UEs. In accordance with embodiments, the resources may be mapped to the associated UEs either one to one, meaning that each UE gets associated to its operator, or the mapping may be more flexible such that certain UEs have to perform roaming in order to perform a particular service. In accordance with further embodiments, additional criteria may be defined, for example, that only a certain share of data, in terms of quota or amount of data, like URLLC data, may be used for roaming by introducing a roaming threshold.

Shared Backhaul

Figure 7:
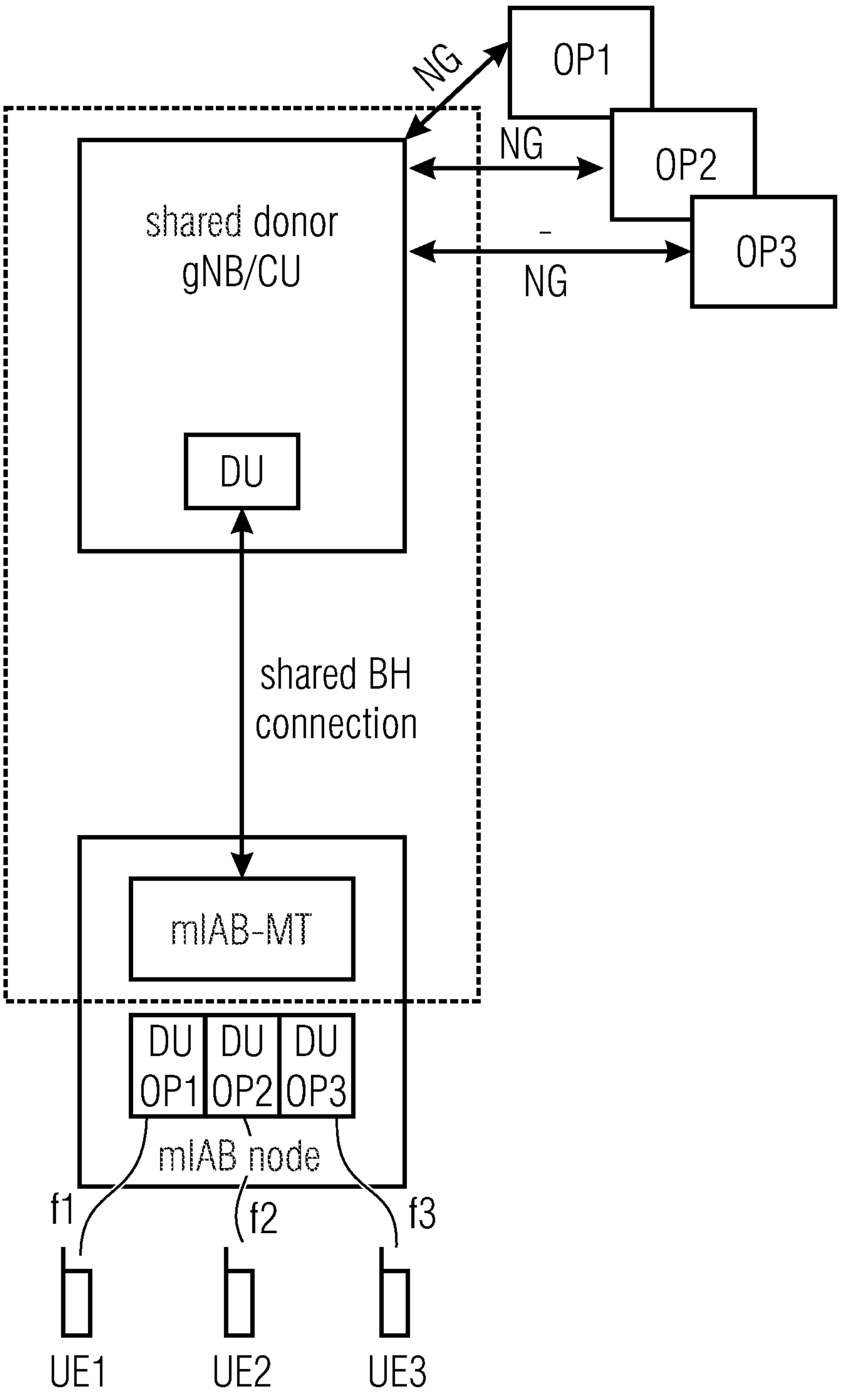
FIG. 7 illustrates an IAB-node that is connected to a shared IAB-donor in accordance with embodiments of the present invention.

In accordance with other embodiments, rather than providing dedicated backhaul connections from the IAB-node, a shared backhaul connection may be provided. FIG. 7 illustrates an embodiment of an IAB-node that is connected to a shared IAB-donor. As is illustrated in FIG. 7, the IAB-node provides a plurality of DU units DU_OP1, DU_OP2, DU_OP3 for providing to the UEs respective dedicated spectra f1 to f3, as explained above with reference to FIG. 6. Instead of providing a plurality of MT units, the IAB-node provides a shared IAB-MT unit that connects via a shared backhaul connection to a shared IAB-donor, which in turn, over the NG interface, connects to the different operators OP1, OP2, OP3, for example, to the respective core networks of the operators. In accordance with embodiments using a shared backhaul, the backhaul from the IAB-node to the anchor base station, namely the IAB-donor, is operated by only one of the mobile networks at a time, supported by the IAB node, like the mIAB-node inside a car. In other words, the backhaul is shared. For example, there may be a proxy central unit, like the IAB-donor, which belongs to the radio access network of one of the network operators. In accordance with other embodiments, the shared backhaul scenario may also be implemented using more than one MT unit at the IAB-node, the MT-units being associated with different operators thereby allowing the IAB-node to switch between the plurality of backhaul connections available to be used as a shared backhaul connection for all operators.

The scenario in accordance with the just-described embodiment employing the IAB-node and the shared backhaul may be referred to as a hybrid form of the above-mentioned MORAN scenario, which is standardized in accordance with 3GPP. In a MORAN, the base stations are shared while the core network is entirely controlled by each network provider. The MORAN standard also supports the sharing of the RAN infrastructure, but each operator uses dedicated radio frequencies and may independently control cell level parameters. In accordance with embodiments of the present invention, in case of an IAB-node using a shared anchor or IAB-donor, there are different options how this may be implemented, for example, separately the UE entities may be implemented at the shared IAB-donor each controlling their own cell parameters, albeit there may be additional power-setting or other restrictions due to the closeness of the users. In a similar way as in the conventional MORAN approach, each network operator may signal parameters that relate to a UE bearer session management, to the context management, to the mobility control and the like.

Figure 8:
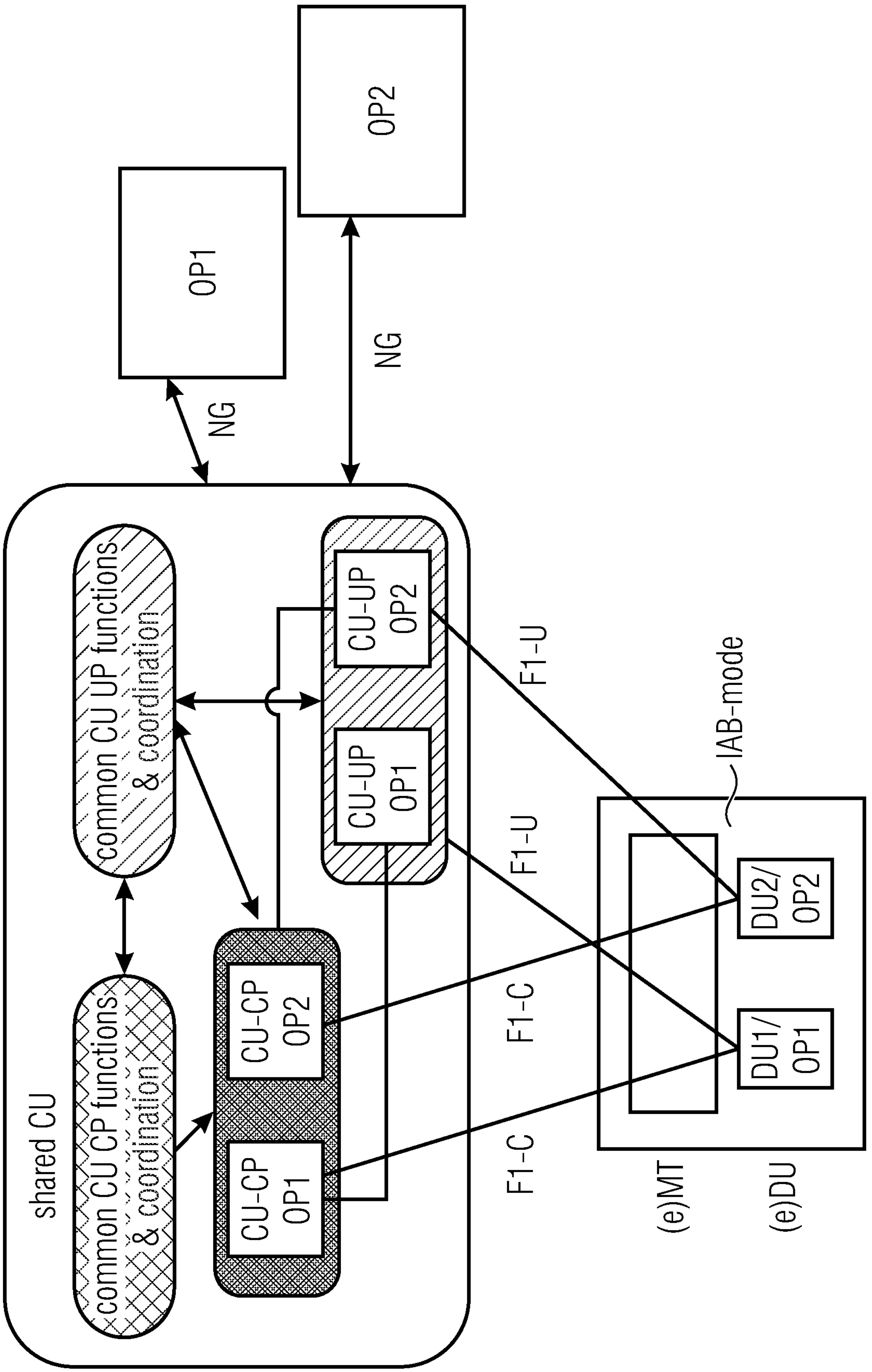
FIG. 8 illustrates a shared IAB-donor in accordance with embodiments of the present invention.

Control-plane functions and user-plane functions on the shared IAB-donor may be divided between common parts and operator-specific parts. In accordance with embodiments, the partitioning between the operator-specific IAB-donor resources, like processors and memory, may be implemented by hardware or software. FIG. 8 illustrates an embodiment of a shared IAB-donor, referred to in the figure as shared CU in accordance with which operator-specific F1 instances of the F1 interface are defined because the access DU entities DU1_OP1, DU2_OP2 of the IAB-node operate separately for the operators. In FIG. 8, the IAB-node is assumed to provide the spectra for operators OP1 and OP2 using the respective DU entities DU1_OP1, DU2_OP2 at the IAB-node. Via the shared MT-entity of the IAB-node, respective control-plane connections via the F1 interface, the F1-C connections are provided to the CU-CP entities in the shared CU for operators OP1 and OP2. Likewise, user-plane connections via the F1-U interfaces are provided to the respective CU-UP entities in the shared CU for each operator OP1 and OP2. Via the NG interfaces, the shared CU is connected to the respective operators OP1, OP2, like the respective core networks thereof, and inside the shared IAB-donor, the common CU-CP and CU-UP functions are handled and coordinated. For example, appropriate common and operator-specific identifiers for the CUs may be provided so that instances of the F1 interfaces may be differentiated and so that the UE F1 AP-specific IDs are unique. Some of the F1-C functions may require coordination between the different operators, for example, a common part like cross-link interference mitigation may require this where the common part of the CU-CP may coordinate, together with operator-specific CU-CP, the TDD DL-UL configuration between the different DU entities of the IAB-node for the different operators.

In accordance with further embodiments, the backhaul adaption protocol, BAP, which is responsible for forwarding of packets between the hops and which supports the QoS on the backhaul channels, may be modified. Conventionally, the BAP supports mapping of UE data radio bearers onto RLC backhaul channels and supported mappings are N:1 and 1:1. The N:1 mapping is conventionally applied to non-GBR bearers, which means that N bearers from different UEs are mapped onto a single backhaul RLC channel. In accordance with embodiments, in order to separate operator-specific RLC channels across the backhaul network, a backhaul RLC channel group is created and designated to each operator, and each RLC channel group may carry all UE radio bearers that belong to a single operator, regardless of the mapping.

Backhaul Triggered Group Signaling

Further embodiments of the present invention are now described which relate to a backhaul-triggered group signaling. RRC provides group and user-specific control plane signaling between a serving base station, BS, and the one or more UEs. This covers, but is not limited to, signaling messages related to the connection configuration or reconfiguration of a link between the BS and the UE. A conventional example is the addition, modification and release of multiple component carriers in carrier aggregation via a primary component carrier, which maintains the RRC connection. Another example is a signaling that supports a handover, HO, between base stations in order to facilitate UE mobility. Since the handover is designed to support each user's mobility, such a signaling is performed by the BS and CN individually for each UE.

In IAB networks, besides each UE, the IAB-MT entity also maintains its RRC connected, idle or inactive state in the CU of an IAB-donor, which is of particular relevance in case of a mobile IAB. When a mobile IAB is deployed within a vehicle, like a car, several UEs are within the confinement of the car and the wireless communication channel between each UE and the DU entity of the IAB-node inside the car is quasi-stationary. Such a scenario is advantageous, as it does not warrant frequent mobility-related signaling exchange between the IAB-donor CU and each individual UE, regardless of the car possibly moving at a high speed.

In accordance with embodiments, e.g., when a proxy signaling entity is provided, the RRC connection between the mobile IAB-node, more specifically, its MT entity, and the IAB-donor may be used as an anchor, whereby a part of the control plane connectivity for all UEs served by the DU entities inside the car terminates in the IAB-MT entity or another proxy entity. In accordance with such embodiments, the one or more backhaul links may be treated separately from the quasi-stationary wireless links between the DU entities of the mIAB-node and the UEs inside the vehicle. In such a scenario, it may be inefficient to handle all mobility-related signaling for each UE individually due to the signaling overhead, particularly in case the number of UEs served by the mIAB-node is high. Therefore, embodiments of the present invention provide for a so-called backhaul-triggered group signaling for handling the control-plane RRC signaling between the IAB-donor and the respective UEs served by a mIAB-node. In accordance with such embodiments, the mobility signaling or at least a part of the mobility signaling is handled towards a group of UEs, and it is assumed that the entire group as well as the mIAB-MT entity has an anchor in the same IAB-donor. The group may be defined either by the IAB-donor i.e. its central unit, by the core network, or by an application server and may be associated with appropriate identifiers in the different network elements or on the different levels of the protocol stack so that the group may be addressed in terms of mobility by the IAB-donor and by the core network, like the AMF.

Thus, a certain signaling, like a mobility signaling in radio access network responsive to an a certain event, such as an IAB-MT measurement report or an IAB-MT handover, may include for each of the UEs involved, like the UEs of a group, a first part individual to the UE and a second part common to some or all UEs of the group or vice versa. The IAB-donor central unit, rather than signaling to each UE the UE specific and the common parts, may signal the first parts of the signaling for the UEs of the group and only one second part for the UEs of the group. Thus one part (e.g., the first part) of the certain signaling is UE-specific and another part ((e.g., the second part) is common.

In accordance with embodiments, the IAB donor signals the first parts of the certain signaling for the UEs of the group via the IAB node, directly or via one or more further IAB nodes, to the respective UEs, and signals only one second part of the certain signaling for the UEs of the group, directly or via one or more further IAB nodes, to the IAB node, which distributes the second part to some or all of the UEs of the group.

In accordance with other embodiments, the first parts of the signaling are integrity protected only or integrity protected and encrypted using respective user-specific integrity-protection keys or integrity-protection keys and encryption keys, and the second part of the signaling is integrity protected only or integrity protected and encrypted using a common group integrity-protection only or integrity-protection and encryption. Hence, group messages may use a common integrity protection algorithm, like a least common denominator, and a key, so as to ensure the integrity protection for RRC messages. In either case, the level of required security may be determined by the CN. For example, CN may decide that, for example, encryption is not required. The IAB donor sends only one signal including the integrity protected only or integrity protected and encrypted first parts and the one integrity protected only or integrity protected and encrypted second part of the certain signaling, directly or via one or more further IAB nodes, to the IAB node and to the respective UEs. The group of UEs verify integrity or verify integrity and decrypt only the one second part using the common group integrity protection and encryption. The UEs verify integrity only or verify integrity and decrypt an integrity-protected or integrity-protected and encrypted first part using their user-specific integrity protection or integrity-protection and encryption. Stated differently, although the signal is received at the UEs, the one common part of the signal may only be integrity-verified or integrity-verified and decrypted by all or a subset of the UEs having the necessary keys but not by the UEs' individual ones, while a UE specific message may only be integrity-verified or integrity-verified and decrypted by the UE to which it is directed using the UE specific keys but not any other UE. The group-common keys for the integrity and the encryption may be changed when UEs leave or join the group. Another option, for example, have only an RRC Reconfiguration-group message, instead of the UE-specific and group messages, implemented. In that case, the message may use a common integrity protection algorithm, like a least common denominator, and a key, so as to ensure the integrity protection for RRC messages. Here, as before, if encryption is also to be used, different parts of RRC message may be encrypted with different keys, UE-specific and group/common keys. The common keys for the integrity and the encryption may be changed when UEs leave or join the group, and require updates between CN and the group, and mIAB and the group.

Group Signal Radio Bearers, SRB

In accordance with embodiments, the backhaul-triggered group signaling may be a group signal radio bearer based solution, group-SRB-based solution. In accordance with such embodiments, the UEs inside the vehicle are handled as a group of UEs associated with the mIAB-node, more specifically, with the mIAB-DU entities, which provide for the wireless access. To handle any group-related RRC signaling, a group-SRB is set up. One group-SRB may handle RAN messages, such as group-SRB. In addition, a group-$SRB_{NAS}$ to handle any group NAS messages may also be setup.

RRC connection setup, RRC connection reestablishment, and RRC connection resumption are specific to each UE so that these messages, which are the above mentioned UE-specific messages, are kept separate from group-intended RRC messages. As described above, the RRC Reconfiguration messages, which are also used for HO, for each specific UE may be transmitted directly to the UEs and contain a pointer to a group RRC message, for example, the above mentioned RRC Reconfiguration-group message carried over the group-SRB. Another option is to use only the RRC Reconfiguration-group message including the differently integrity-protected/encrypted UE specific and common parts, as also described above.

Figure 9:
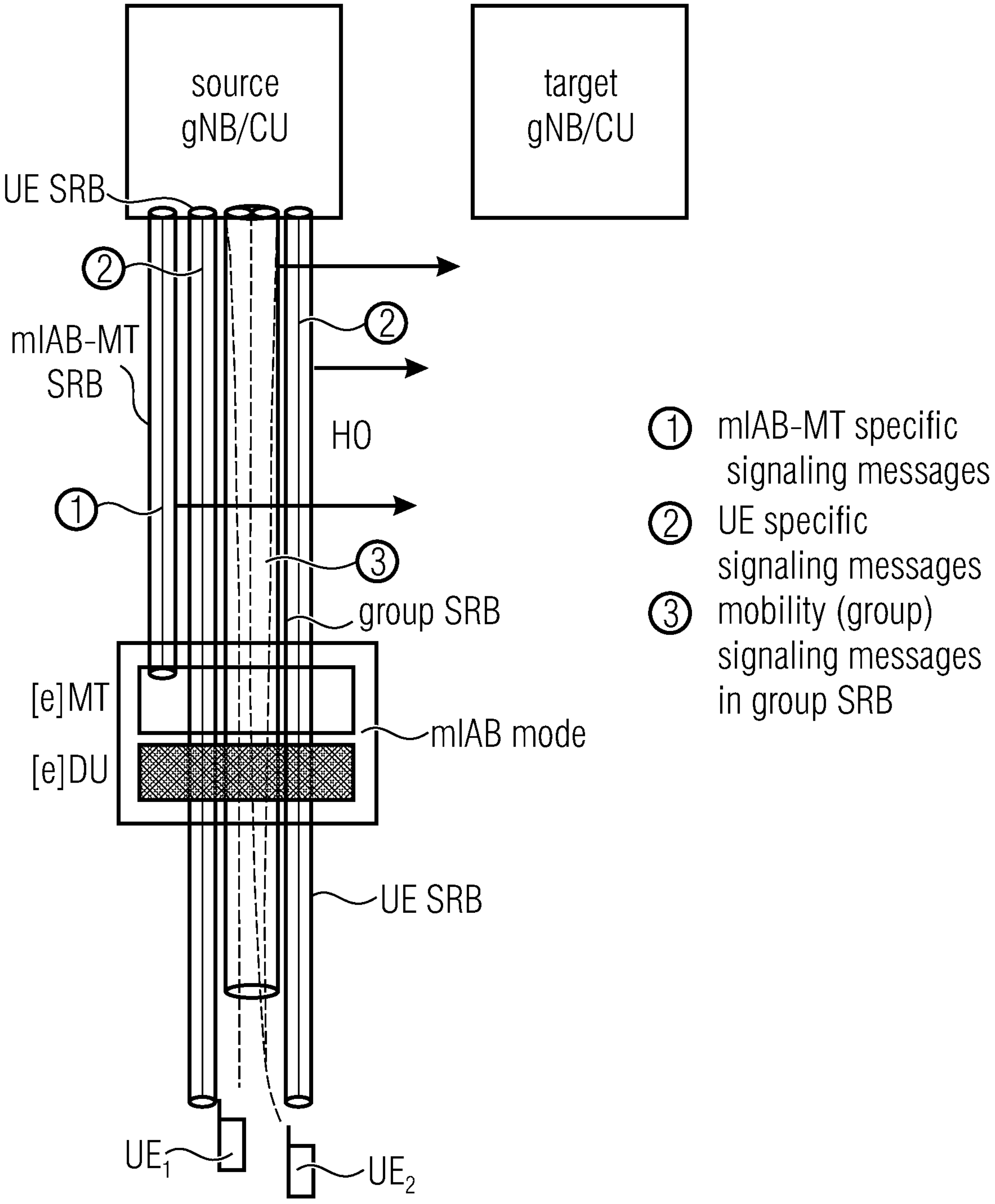
FIG. 9 illustrates the treatment of UEs inside a vehicle as a part of a group addressed by a group-SRB used to transfer all group-related signaling in accordance with embodiments of the present invention.

FIG. 9 illustrates an embodiment in accordance with which UEs inside a vehicle, like a car, are treated as a part of a group addressed by a group-SRB which is used to transfer all group-related, i.e., common, RRC signaling on the downlink. FIG. 9 illustrates an embodiment using a mIAB-node including one or more DU entities and one or more MT entities. In the depicted embodiment, it is assumed that UE1 and UE2 are served by the mIAB-node, which is connected to a source gNB or source IAB-donor. UE1 and UE2 form a group, and FIG. 9 illustrates respective SRBs that are established, namely the mIAB-MT-SRB for transferring all RRC signaling that is related to the connection between the mIAB-MT entity to the source, like RRC messages between the IAB-donor central unit and the IAB-MT, the respective UE-SRBs for transferring all UE specific RRC signaling from the source directly to the UEs, and the group-SRB which is implemented in accordance with embodiments of the present invention for transferring all RRC signaling associated with the group, i.e., all signaling being common to all UEs.

In the embodiment of FIG. 9, the mIAB-MT entity is not part of the group, which may be advantageous, for example, as the mIAB-MT entity is served by a different DU entity than the UEs in the car. Hence, the grouping the UEs, in accordance with the embodiment of FIG. 9, enables the reuse of the F1 interface procedures between the mIAB-DU and the source-CU for the transfer of RRC messages to the UEs. For example, such a grouping provides the flexibility for a sequence of handovers, either a handover taking place first for the UEs and then for the IAB-MT or vice versa. This is indicated in FIG. 9 by the arrows HO, and dependent on the sequence of the elements handed over to the target-CU, the respective SRBs are transferred to the new anchor, namely the target-CU.

In accordance with embodiments, the group-SRB may be established in such a way that it carries any RAN RRC group-related signaling, including at least a part of the handover signaling. Similarly, all NAS group-messages may be carried over NAS-specific group-SRB (also using RRC), such as a group-$SRB_{NAS}$. In conventional approaches SRBs carry bidirectional, user-specific RRC messages between a base station and a UE, and these RRC messages are mapped onto different logical, transport and physical channels. For example, SRB0 is used in case of an RRC connection set up, an RRC connection reestablishment, an RRC connection resumption from the inactive state and the like. The RRC connection establishment involves the establishment of the SRB1 so that the SRB1 is used for RRC messages in the connected stage, such RRC reconfiguration messages. SRB2 is used for NAS messages, while SRB3 is used for RRC messages when the UE is dual connected to two base stations, and the SRB3 is then used for specific RRC messages to/from the secondary gNB.

In accordance with other embodiments, dedicated logical, transport and physical channels on the downlink may be used to transmit handover-related group signaling or any other relevant group signaling from the anchor or CU. The data may be scrambled using a group-mIAB radio network temporary identifier, RNTI, similar as, for example, in case of evolved multimedia broadcast multicast services, eMBMSs. However, in case of a mobile IAB-node, in accordance with embodiments, the data, i.e., the signaling, is not sent by all the surrounding cells and the radio resources may be reserved on demand, for example, only in case of a handover or when other group-related signaling is required. The dedicated radio resources may occupy only a fraction of the overall system bandwidth and may be reserved for several radio frames using, for example, a semi-persistent scheduling or configured grants. Considering that the communication is about group-signaling only and also within a confined space, there is no disadvantage using a lowest MCS among the UEs. Some of the initial configuration for the RAN and NAS group-SRBs may be broadcast in a special or predefined SIB for the mIAB-node.

In accordance with embodiments, a physical downlink shared channel may be used for the signaling instead of the dedicated physical channel, similar as in a conventional single-cell point-to-multipoint, SC-PTM, feature. SC-PTM allows one cell to broadcast the same content to a group of UEs multiplexing broadcast and unicast data on the same PDSCH. By providing a common radio identifier, several users may access the same data, as described in [14]. In accordance with embodiments of the present invention, the group-signaling messages may be sent via a broadcast to the users in the car by the mIAB-node.

In accordance with further embodiments, one or more additional or new handover commands may be provided for addressing the common configuration for all UEs. In the conventional approaches, as part of the HO execution, the HO command, RRC reconfiguration, normally carries common and UE-specific configuration data of each protocol layer. The common parameters include, for example, UL/DL carrier frequency, common configuration of radio resources, UL/DL TDD configuration and the like. The UE specific parameters include, for example, a cell-specific UE ID, i.e., a C-RNTI, a SRB reconfiguration and a data radio bearer, DRB, reconfiguration, new measurement configurations, a new KgNb* security key derived from a previous key and the like. However, in case of an inter-IAB-donor HO including a mIAB-node, the serving, physical DU does not change, although a new logical DU may be setup, associated with a new IAB-donor. Hence, the RRC reconfiguration may also carry all the common and UE-specific parameters for this new logical DU.

In accordance with embodiments, the UE-specific configuration or reconfiguration parameters may be sent as a unicast signaling to each UE. The unicast RRC message may include a pointer to a group-signaling message the new parameters are referring to. The UL signaling, such as a confirmation of the group-related HO may be send as a unicast, which may then be multiplexed on the uplink shared channel with user data.

Figure 10:
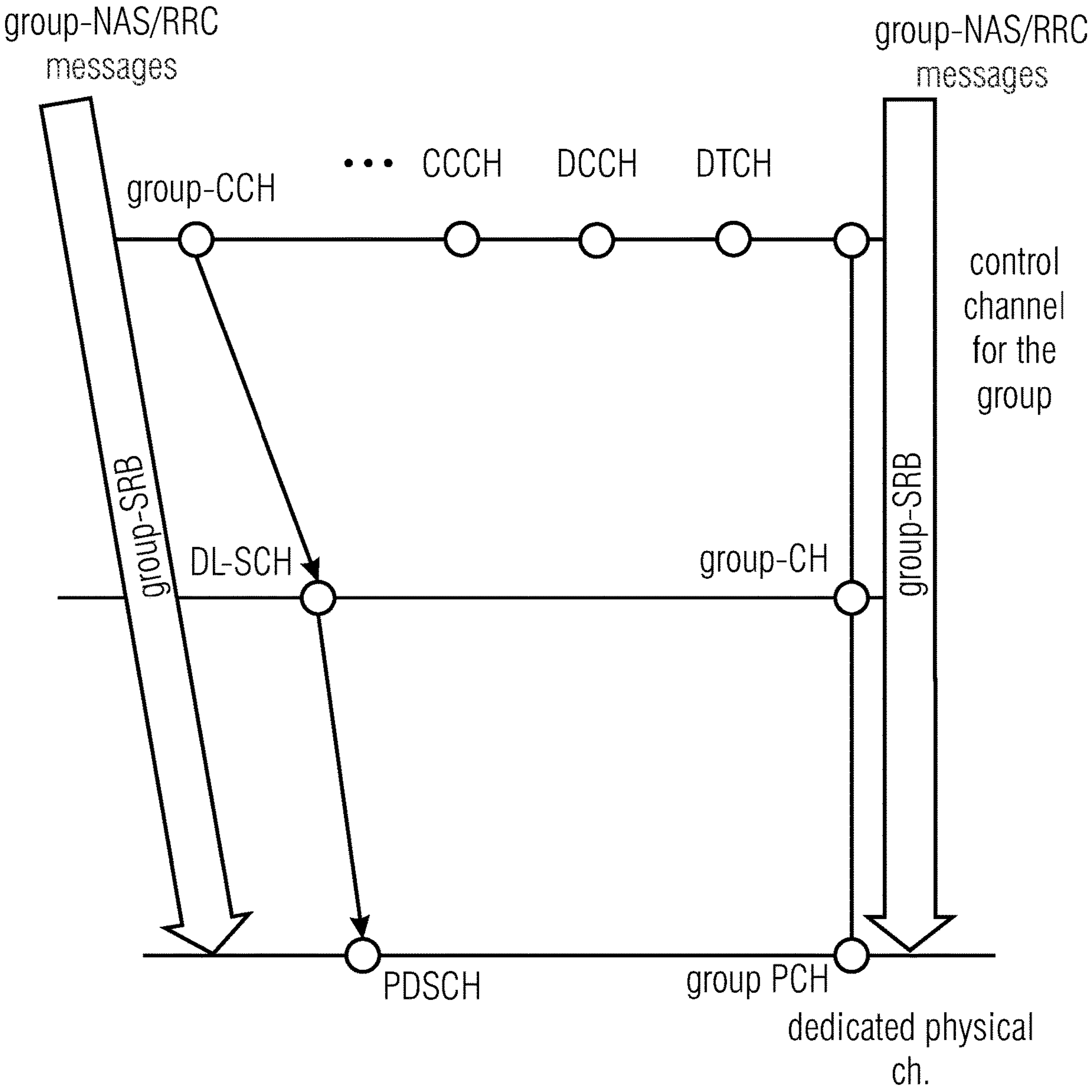
FIG. 10 illustrates the group-SRB used to deliver group-related NAS and RRC messages in accordance with embodiments of the present invention.

In accordance with embodiments, the group-SRB carrying the group-related messages and being configured with common parameters may also be mapped on existing dedicated, logical control channels and then onto the physical shared channel, as is illustrated in FIG. 10 illustrating the group-SRB that is used to deliver group-related NAS and RRC messages. The left-hand side of the figure depicts the case when the group RRC and NAS messages, carried over group-SRB, use, e.g., a dedicated logical control channel for the group (group-CCH), This dedicated logical channel uses the downlink-shared transport channel, which in turn uses physical downlink shared channel, enabling more efficient use of the radio resources. The right-hand side of the figure depicts the case when the group RRC and NAS messages use, e.g., a dedicated logical control channel for the group, a dedicated transport channel Group-CH, which, in turn, uses dedicated resources physical channel resources, similar to multicast physical channel.

In accordance with further embodiments, in case HO commands include only UE-specific configuration messages, the group-SRB may not be activated for the purpose of the HO.

In accordance with other embodiments, the group RRC message may be a concatenation of common and UE-specific parts which may be integrity-verified or integrity-verified and decrypted using a combination of group and user-specific keys and integrity protection algorithms.

In accordance with embodiments, the trigger for the RRC group-command may be, in case of mobility, a measurement report from the mIAB-MT entity, for example an A3 or A5 event in case a neighboring cell does not belong to the serving CU. In accordance with such embodiments, the serving CU may send a HO command for the group, like the RRC group command carried on the group-SRB. The UE-specific command may contain only the minimum delta configuration, for example for a particular radio bearer reconfiguration, if required, or changes related to the Packet Data Control Protocol, PDCP, configuration due to the change in the CU or the change in the cell RNTI or due to other change parameters.

FIG. 11 illustrates a signaling procedure for a group-SRB in accordance with embodiments of the invention for migrating a mIAB-node from a source CU, S-CU, to a target CU, T-CU, followed by the handover of the UEs associated with the mIAB-node. FIG. 11 illustrates UE1, UE2 and UE3, which form a group of UEs and are RRC connected to the IAB-node mIAB1. The mIAB1 has at least one distribution unit DU1 providing for the connection to the UEs, and at least one mobile termination MT providing the backhaul connection to the S-CU. Further IAB-nodes IAB2, IAB3, the T-CU, and the core network, CN, are illustrated.

For grouping UE1, UE2 and UE3 into one group, the S-CU sends 400 a list of the UEs connected to the mIAB1 to the CN. The CN creates 402 a group and for the group as group ID g-$mIAB_1^{CN}$ and a group key $KmIAB_1^{CN}$. The group key $KmIAB_1^{CN}$ may be used to compute integrity-protection and encryption group keys that are used for communication with the group from the CN, i.e. for Non-Access Stratum (NAS) messages. The CN also computes the group key $KmIAB_1^{CU}$ and together with the group ID, they are signaled 404 to the S-CU, thereby instructing the S-CU to create the IAB-node associated group. Responsive to the received information, the S-CU creates 406 the group and for the group a group ID and derives group RRC integrity protection or integrity protection and encryption group keys from $KmIAB_1^{CU}$. The mIAB1 uses a group identifier mIAB-gRNTI 408 for signaling messages to the group. The mIAB-gRNTI may be broadcast to the UEs using a SIB. Further, mIAB sends group security command 410. The UEs in the group check the integrity of the message, and compute respective group keys $K_{mIAB}$ 412, which include integrity protection and potentially encryption keys for the RRC group commands. UEs respond individually 410*a* with a group security complete message. The mIAB1 performs measurements and, responsive to an event, like an A3 event, transmits 414 a measurement report to the S-CU. The S-CU, responsive to the report transmits to the T-CU a HO request 416. Responsive to an HO acknowledgement 418 from the T-CU, the S-CU signals the handover RRC Reconfiguration message 420 to the mIAB1, that is its MT, and triggers the group handover 422. The group handover 422 includes the migration 430 of the mIAB1 from the S-CU to the T-CU, followed by the transfer 440 of the UEs. The migration 430 of the mIAB1 from the S-CU to the T-CU includes the steps shown in FIG. 11 so that the mIAB1 is connected to the T-CU. For transferring the UEs, as described above, the UE specific RRC messages 442 for the HO are transmitted from the S-CU to the UEs, while the group common RRC message 444 for the HO is transmitted using the gSRB. Responsive to the RRC messages the UEs send the RRC Reconfiguration Complete messages 446 to the T-CU, thereby completing the path switch 450. Thus, in accordance with embodiments, the following main steps are carried out in case of a handover for the UEs of the group:

An RRC command is sent on the F1 interface as an RRC DL message transfer. Group-RRC integrity protection algorithm keys or integrity protection and encryption keys may be used for the group-SRB messages, and the generation and derivation of the keys may rely on the CU or the AMF or any other entity in the core network. The keys may be computed by all UEs of the group.

- The DU entity of the IAB-donor sends a group-RRC message to all users in the car, and it is assumed that mIAB-DU already assigned to the users in the car a group identifier, for example an mIAB-gRNTI. The mIAB-gRNTI may be used to descramble group specific RRC messages or parts thereof that are related to, for example, the mobility signaling.
- The group-SRB messages are handled using the existing F1 RRC message transfer protocol.
- A F1AP UE context setup may be performed on the F1 interface between the new or target CU and the appropriate DU as well as appropriate user-plane tunnels
- A confirmation of a successful completion of the reconfiguration may be sent back to the target CU by each UE using the UE-specific SRB.
- The MT entity may perform the handover and RRC reconfiguration separately when connecting to the DU entity of the target CU.

The above-described embodiments making use of a group SRB are advantageous over individual signaling in that the UE-specific RRC message size is kept at a minimum. This is done at the expense of introducing a new type of RRC message that provides common configuration information for the group, however, this message may be used to facilitate any group-related signaling and, also may enable an on demand establishing of the group-SRB.

Flexible Signaling Configuration

In accordance with other embodiments of the backhaul-triggered group signaling, not only the UEs but also the mIAB-MT entity may be part of the group. To reduce the amount of signaling between each UE and the CU, the mIAB-MT entity may act as a proxy thereby reducing the amount of signaling to and from a specific UE.

The proxy entity may be the IAB-MT or another UE forming a kind of Master UE or group representing UE. Also in such a scenario the signaling is split between group common and UE-specific signaling. Group-related signaling is to be handled by the proxy entity while all RRC signaling which is really UE specific is forwarded by the DU to the individual UEs. The functionality of the Master UE, also referred to as representative group UE or group mobility message handling entity, may be implemented in various ways, e.g., as a separate physical UE inside the car, within any of the UEs forming the group, as an software entity inside the MT or in other suitable ways.

Figure 12:
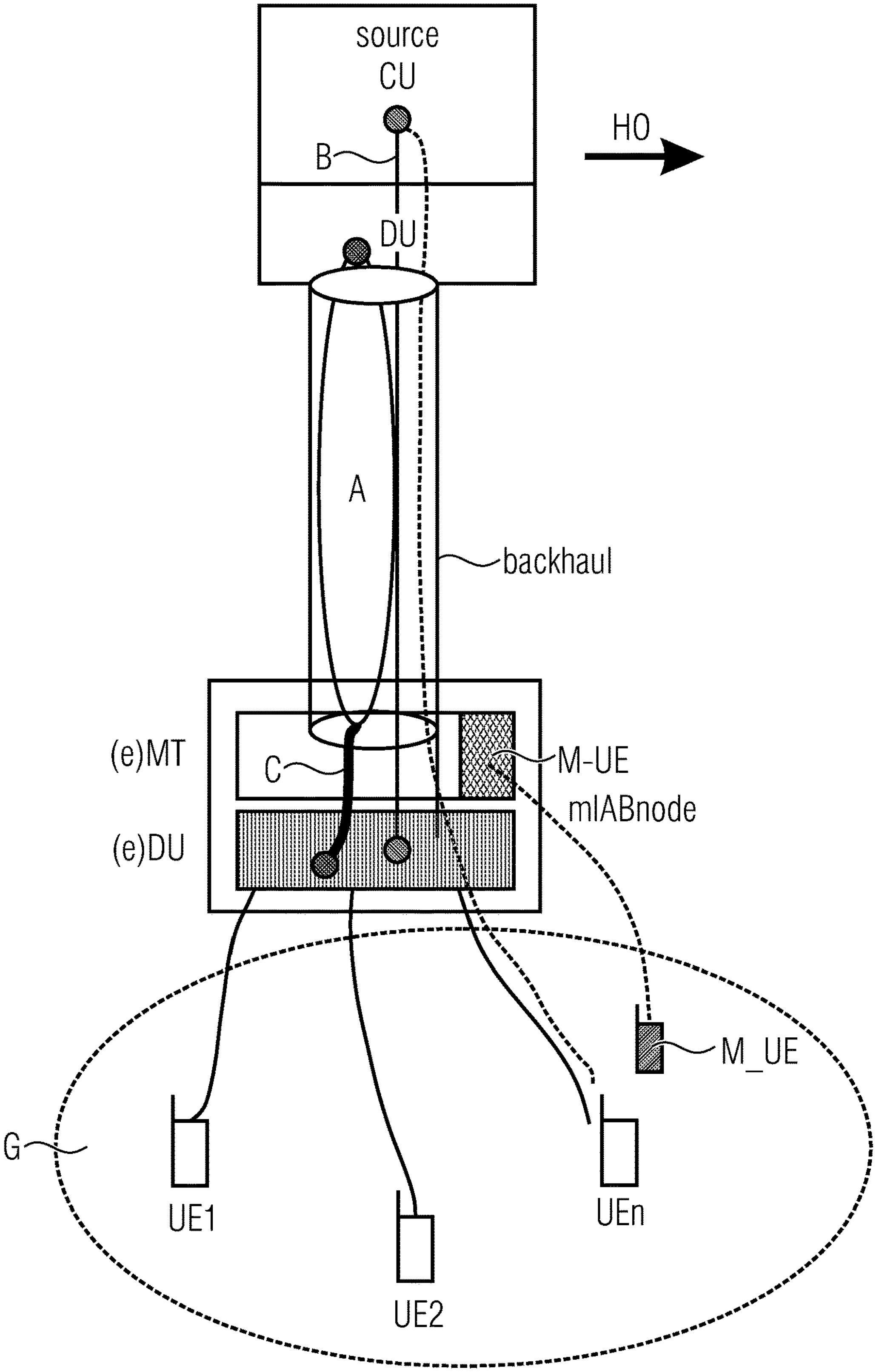
FIG. 12 illustrates a further embodiment of the backhaul-triggered group signaling in accordance with the present invention.

FIG. 12 illustrates an embodiment of a backhaul-triggered group signaling. The MT and DU entities are referred to as eMT and eDU, indicating enhancements to the conventional MT and DU functionality. FIG. 12 illustrates a backhaul-triggered signaling using RRC message splitting between individual messages and group common mobility and backhaul related messages. The group common messages are handled by a master UE, M_UE, also referred to as a group representing UE or as a group mobility message handling entity, while all RRC signaling which is UE specific is forwarded by the DU entity of the mIAB-node to the individual UEs, as is conventionally done. The functionality of the master UE may be implemented in as a separate physical UE inside, e.g., within any of the UEs forming the group, or it may be implemented as a software entity inside the MT entity of the mIAB-node. As is illustrated in FIG. 12, the master UE may be part of the MT or may be one of the UEs connected to the mIAB-node, and the master UE is responsible for all group common mobility and backhaul-related RRC signaling on behalf of all UEs connected to the DU of the IAB-node. In FIG. 12, the RRC signal paths from the CU to the UEs are illustrated. The RRC message splitting has been initiated and performed at the source CU and is handled in the MT entity or DU entity of the IAB-node before being forwarded selectively to the individual UEs, e.g. via the master UE.

Figure 13:
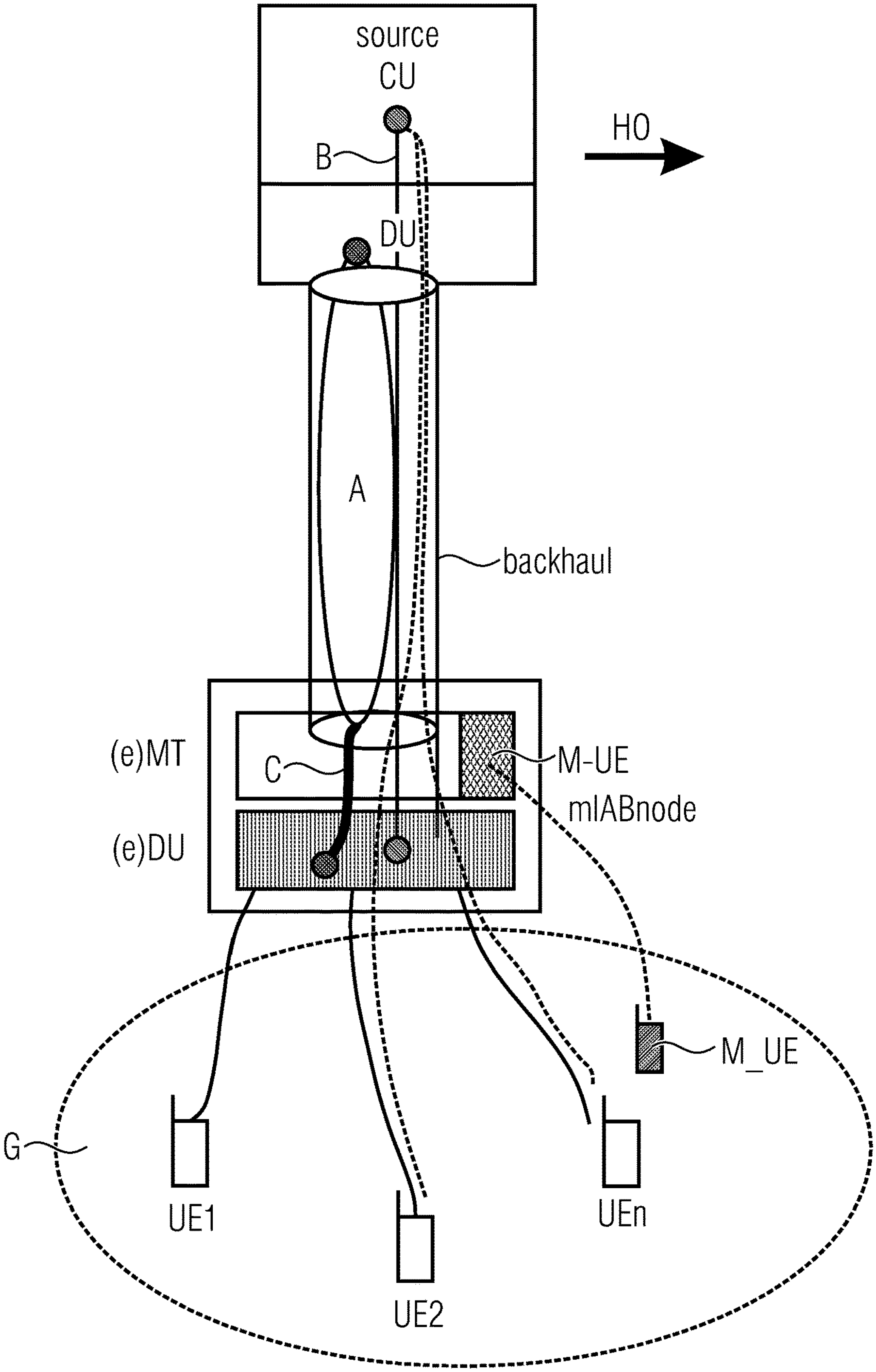
FIG. 13 illustrates an hierarchical or RRC-signaling in accordance with embodiments of the present invention.

In accordance with embodiments, a hierarchical RRC-signaling may be used including a common type of messages, like mobility and backhaul related messages that are handled by the master UE illustrated in FIG. 13 on behalf of all UEs below the DU entity of the mIAB-node. UE specific messaging may be performed directly between the CU and each UE, as is illustrated by the lines. All UEs together with a master-UE M form the group G supporting the split RRC group signaling. As mentioned above, the functionality of the master-UE may be implemented in any of the UEs being capable to do this, or may be part of the MT entity or the IAB-node.

FURTHER EMBODIMENTS

In accordance with further embodiments, the link anchoring in the network may be performed in a hierarchical fashion. When assuming that the mobile IAB-node is not active, for example because the vehicle is not active, like a car having its engine turned off or a train or ship not yet being in service, when the vehicle is activated, for example when the engine is switched on, the mobile IAB-node may connect itself to the network as a conventional IAB-node, which includes additional capability for the mobility of the node and support for backhaul triggered group RRC signaling and other features as described in the preceding embodiments.

Once network access is granted and the backhaul-triggered group RRC feature support is confirmed and established, the one or more DU entities of the IAB-node may advertise the network available inside the vehicle, for example, using SIB or a modified SIB. After the UE detecting the synchronization signal block, SSB, from the one or more DU entities of the IAB-node, the UE may initiate the RACH procedure. In accordance with embodiments, the RACH procedure may be enhanced by interfaces and procedures inside the car, between the on board unit, OBU, and the UE so as to prevent unauthorized access of users being close to the vehicle, like pedestrians or passengers standing on the platform of a train station or people in a car close to the car holding the IAB-node. UEs inside the vehicle may detect the SIB including the PLMN and further features, like the backhaul-triggered group signaling, and may start the RACH procedure to the DU entity of the IAB-node, and via the IAB-node to the network. In accordance with embodiments, some of the protocol steps may terminate in the same unit or entity in this UE at the network side, while at the termination or UE side, some or all mobility related messages with respect to the shared link between the MT entity or the IAB-UE and the base station may terminate in the MT unit of the IAB-node. Specific parts of the signaling may be forwarded or transcribed to the UE inside the vehicle.

In accordance with yet further embodiments, a split message termination scheme at the user side may be implemented allowing to separate real UE specific RRC messages from messages which are common or at least partly common for all UEs inside the vehicle. Such common message parts of the RRC protocol stack may be handled on behalf of all of the UEs by the MT entity of the IAB-node. In accordance with other embodiments, an additional signaling between the MT entity of the IAB-node and the one or more UEs may be provided, either directly or indirectly or over the top from the MT entity to the UE passing through the DU/CU and potentially parts of the core network. The direct signaling has the advantage of being local and efficient but requires a significant change in the standard specification, since according to the current philosophy the UE is connected transparently via the DU to the CU which handles all RRC signaling. An embodiment for the direct MT to UE communication may include feeding in messages via the DU, which are either non-UE-specific encrypted or unencrypted or encrypted with a key known to the MT and the UE, using the same analogy as described in earlier embodiments. The MT may also refer to RRC messages it was responding to on behalf of the UEs so that these messages are readable from the MT in terms of RRC message encryption.

Figure 14:
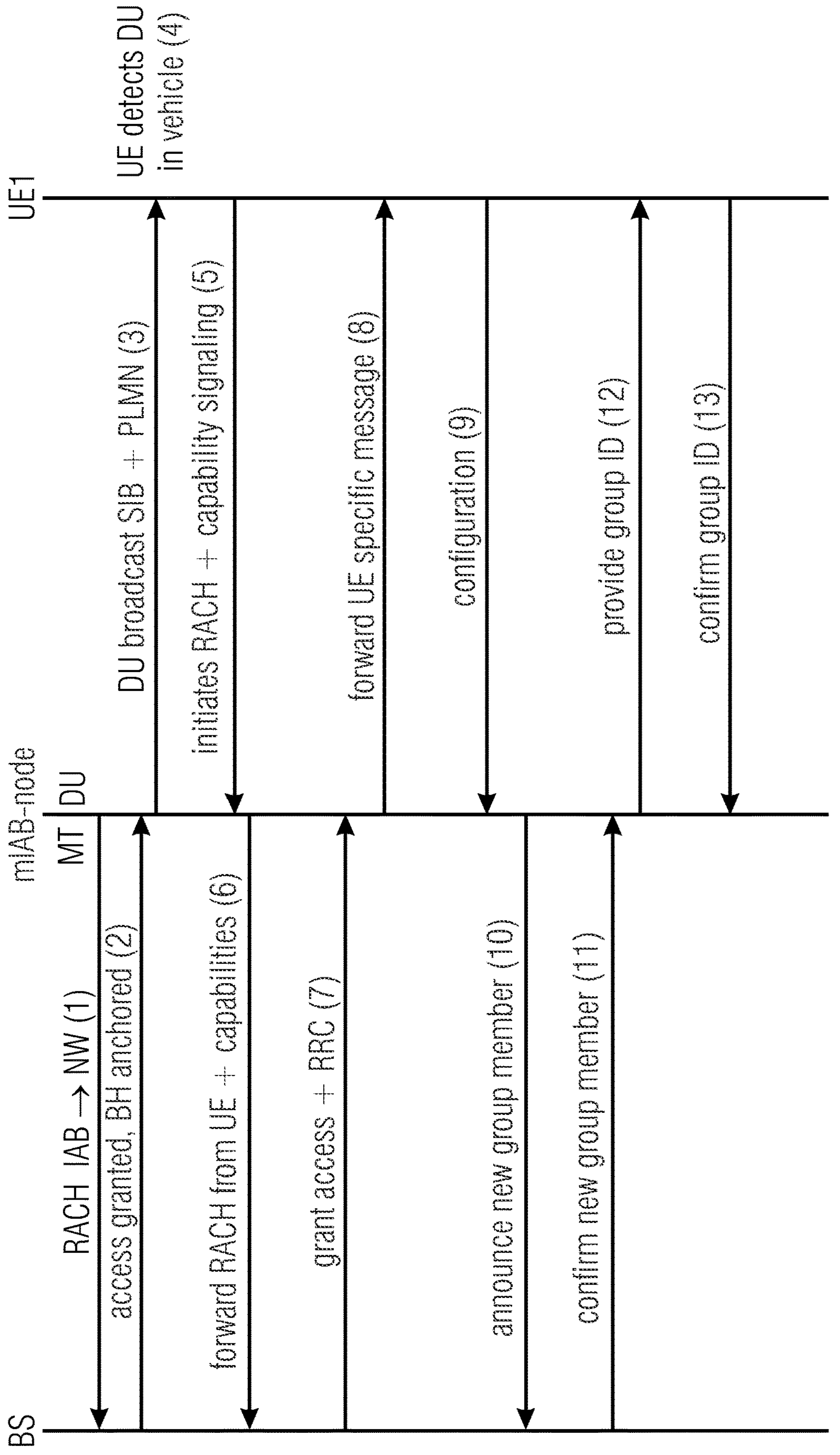
FIG. 14 illustrates connecting a UE via a mobile IAB-node to a network in accordance with embodiments of the present invention.

In accordance with further embodiments, a functional signaling split at a network side may be provided. Such a split at the network side may be beneficial, for example, for specific priority handling of an aggregate backhaul link during HO procedures. The backhaul-triggered group RRC may be combined also with the shared backhaul approach via the mobile IAB-node described above and may terminate in one or more multiple base stations of a single MNO and/or in one or more multiple base stations of multiple MNOs. FIG. 14 illustrates the connection of a UE via a mobile IAB-node to a network in accordance with embodiments of the present invention. At (1) the mIAB-node, via its MT entity, initiates a RACH procedure with the IAB-donor or the base station, BS, for connecting to the network, NW. At (2) the BS accesses grant to the network and anchors the backhaul BH from the mIAB-node to the BS, thereby initially anchoring the mIAB-node in the network. Once anchored in the network, at (3) the mIAB-node, via its DU entity, broadcasts the SIB for announcing to UEs the PLMNs. At (4), a UE detects the DU entity and, at (5) and (6), initiates the RACH of the UE via the DU to the network and forwards also its capabilities indicating, e.g., that the UE supports the configuration of a backhaul-triggered group RRC protocol. Thus, after the UE has identified at (4) a suitable network announced in the proximity of the UE, for example by listening to the SIB broadcast by the DU, the UE starts the RACH procedure (5) to the DU. The message is forwarded (6) to the CU that includes, for example, access allowance request to the MNO's core network and/or associated MNO's core network in case of local roaming or shared spectrum access. At (7) the BS grants the UE access to the network and transmits the RRC messages to the mIAB-node, i.e., the common RRC messages and the UE specific RRC messaged, the latter being forwarded at (8) from the mIAB-node to the UE. Responsive to the confirmation (9) by the UE, the mIAB-node announces (10) to the BS the UE as a new group member. The BS confirms (11) the new group member and the mIAB-node provides (12) the UE with the group ID which the UE confirms (13).

Embodiments of the present invention provide a variety of backhaul and access spectrum and infrastructure embodiments using shared and dedicated spectra, while relying on an existing IAB architecture as a baseline. The embodiments of the present invention are advantageous because a better cell-selection of the mIAB-DU is enabled while leveraging the backhaul measurements in the mobile environment. Also, reduced radio measurements by the UEs in connected mode are provided while avoiding ping-pong handover between mIAB-DU and macro cells. A further advantage of the inventive approach is that shared backhaul anchoring in a shared CU or shared core network element scenario is provided, and a backhaul-triggered RRC signaling is enabled which allows for the separation between common and UE specific RRC signaling and reduction of signaling.

General

The above embodiments were primarily described with reference to a mobile IAB node, however, the present invention is not at all limited such embodiments. Rather, the above described embodiments may also be realized using a in non-mobile IAB-node, i.e., in stationary scenarios. In accordance with embodiments, a stationary IAB node may be capable of connecting to the one or more IAB donors via different backhaul links.

Although the respective aspects and embodiments of the inventive approach have been described separately, it is noted that each of the aspects/embodiments may be implemented independent from the other, or some or all of the aspects/embodiments may be combined.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments of the present invention, a user device comprises one or more of the following: a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and requiring input from a gateway node at periodic intervals, a mobile termination, or a stationary termination, or a cellular IoT-UE, or a vehicular UE, or a vehicular group leader (GL) UE, or a sidelink relay, or an IoT or narrowband IoT, NB-IoT, device, or wearable device, like a smartwatch, or a fitness tracker, or smart glasses, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

In accordance with embodiments of the present invention, a RAN network entity, like the gNB or the IAB-donor, comprises one or more of the following: a macro cell base station, or a small cell base station, or a central unit of a base station, or a distributed unit of a base station, or a road side unit (RSU), or a remote radio head, or an AMF, or an MME, or an SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 15:
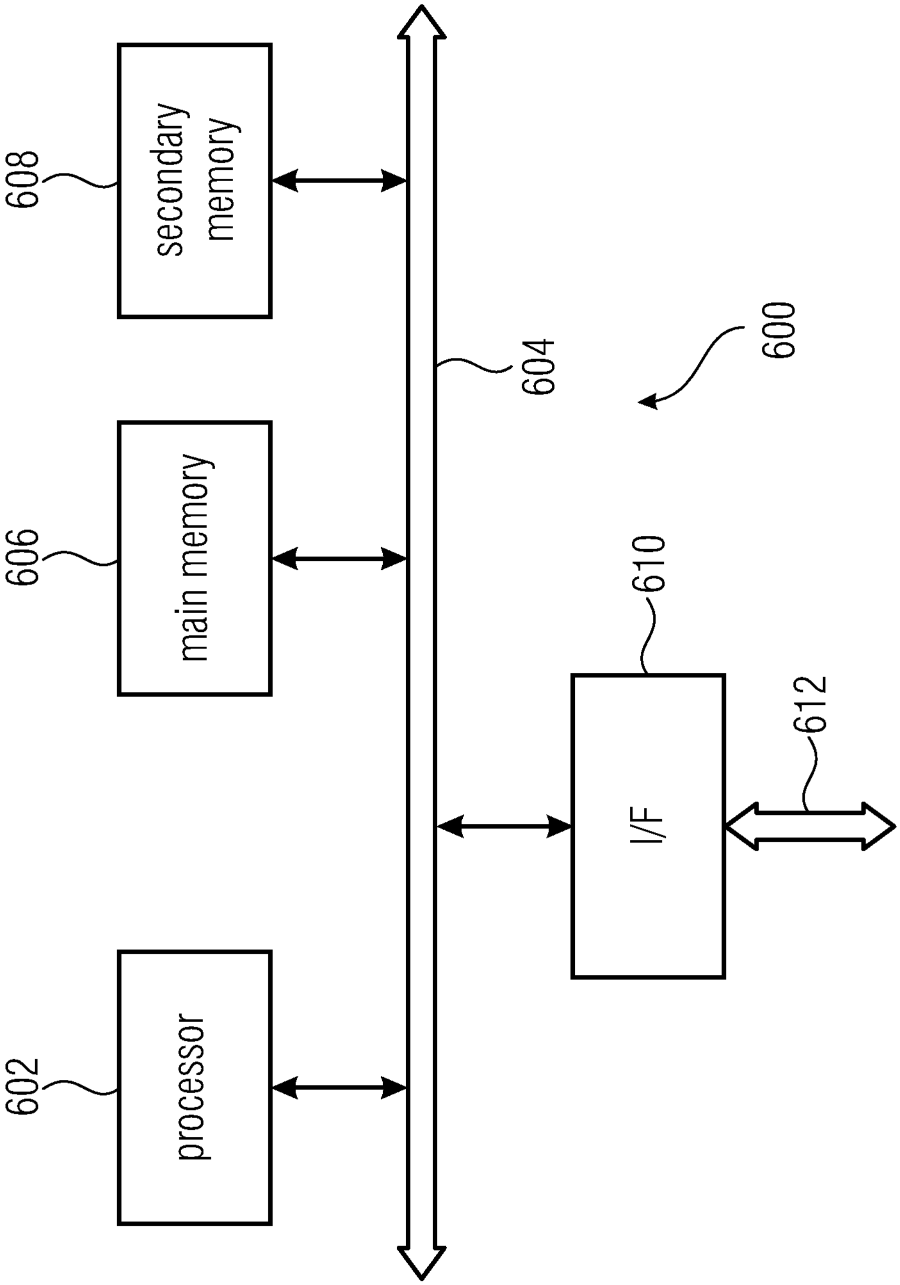
FIG. 15 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 15 illustrates an example of a computer system 600. The units or modules as well as the steps of the methods performed by these units may execute on one or more computer systems 600. The computer system 600 includes one or more processors 602, like a special purpose or a general-purpose digital signal processor. The processor 602 is connected to a communication infrastructure 604, like a bus or a network. The computer system 600 includes a main memory 606, e.g., a random-access memory, RAM, and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] 3GPP TR 36.836, Study on mobile relay, Release 12, V12.0.0

[2] 3GPP TR 36.806 Relay architectures for E-UTRA (LTE-Advanced), V9.0.0

[3] RP-201293, New WID on Enhancements to Integrated Access and Backhaul, Rel 17

[4] R3-109e Meeting Report, R3-206937

[5] R3-110e Meeting Report, R3-205900

[6] R3-111 e Meeting Agenda with notes, R3-xxx

[7] QCOM, R3-206208, Inter-Donor IAB Node Migration Enhancement

[8] Google, R3-206292 Discussion on Inter-donor migration

[9] CATT, R3-206294, Inter IAB donor-CU topology adaptation

[10] Ericsson, R3-206586, Inter-donor Load Balancing in IAB Networks

[11] AT&T, R3-206332, Principles of Group Mobility for Inter-donor IAB-node Migration

[12] Samsung, R3-205999 Discussion on inter-donor IAB node migration procedure

[13] 3GPP, TS 23.251, Network Sharing; Architecture and functional description, v16.0.0

[14] M. Säily et al, 5G Radio Access Networks: Enabling Efficient Point-to-Multipoint Transmissions, IEEE VT Magazine, December 2019

ABBREVIATIONS

| Abbreviation | Definition | Further description |
|---|---|---|
| 2G | second generation | |
| 3G | third generation | |
| 3GPP | third generation partnership project | |
| 4G | fourth generation | |
| 5G | fifth generation | |
| 5GC | 5G core network | |
| AP | access point | |
| ARQ | automatic repeat request | |
| BS | base station transceiver | |
| BTS | base station transceiver | |
| CU | central unit | |
| D2D | device-to-device | |
| DL | downlink | |
| DRB | data radio bearer | |
| DU | distributed unit | |
| ECGI | E-UTRAN cell global identifier | |
| E-CID | enhanced cell ID | |
| eNB | evolved node b | |
| EUTRA | Enhanced UTRA | |
| E-UTRAN | Enhanced UTRA network | |
| gNB | next generation node-b | |
| IAB | integrated access and backhaul | |
| ID | identity/identification | |
| KPI | key-performance indicator | |
| LTE | Long-term evolution | |
| MNO | mobile network operator | |
| mIAB | mobile IAB node | |
| MT | mobile termination at IAB node | |
| NCGI | new radio cell global identifier | |
| NG | next generation | |
| ng-eNB | next generation eNB | node providing E-UTRA user plane and control plane protocol terminations towards the UE, and connected via the NG interface to the 5GC |
| NG-RAN | either a gNB or an ng-eNB | |
| NR | new radio | |
| NR-U | NR unlicensed | NR operating in unlicensed frequency spectrum |
| OAM | operation and maintenance | |
| OEM | OEM original equipment manufacturer | |
| OTT | OTT over-the-top | |
| PCI | physical cell identifier | also known as PCID |
| PHY | physical | |
| PLMN | public land mobile network | |
| QCL | quasi colocation | |
| RA | random access | |
| RACH | random access channel | |
| RAN | radio access network | |
| RAT | radio access technology | |
| RF | radio frequency | |
| R-PLMN | registered public land mobile network | |
| RRC | radio resource control | |
| RS | reference signal | |
| RSRP | reference signal received power | |
| RSRQ | reference signal received quality | |
| RSSI | received signal strength indicator | |
| SIB | system information block | |
| SINR | signal-to-interference-plus-noise ratio | |
| SIR | signal-to-interference ratio | |
| SL | side link | |
| SNR | signal-to-noise ratio | |
| SOTA | state-of-the-art | |
| SRS | sounding reference signal | |
| SS | synchronization signal | |
| SSB | synchronization signal block | |
| SSID | service set identifier | |
| SS-PBCH | sounding signal/physical broadcast channel | |
| TAC | tracking area code | |
| UE | user equipment | |
| UL | uplink | |
| URLLC | ultra-reliable low latency communication | |
| WLAN | wireless local area network | |

The invention claimed is:

1. A wireless communication network, comprising:

one or more integrated access and backhaul, IAB, donors, one or more IAB nodes, the IAB node connected, directly or via one or more further IAB nodes, to the IAB donor, and one or more user equipments, UEs, wherein the UE is connected via an IAB node to an IAB donor, wherein the UE monitors one or more cell selection or reselection parameters associated with the IAB node, and wherein, for connecting to the IAB node or for staying connected to the IAB node, the UE adds a bias to the cell selection or reselection parameter associated with the IAB node.

2. The wireless communication network of claim 1, wherein at least one of the IAB nodes is a mobile or moving IAB node in a vehicle, or a stationary IAB node capable of connecting to the one or more IAB donors via different backhaul links.

3. The wireless communication network of claim 2, wherein a UE identifies an IAB node to be a mobile or moving IAB node when one or more measurements performed by the UE on a connection between the UE and the IAB node remain constant or within predefined boundaries, thereby indicating the UE's connection to the IAB node to be static with no or a number of cell changes below a threshold, wherein the measurements may comprise one or more of the following: a path loss, a Reference Signal Received Power, RSRP, a Signal to Noise and Interference Ratio, SINR, a frequency flat channel, and/or when the UE detects that it is mobile.

4. The wireless communication network of claim 1, wherein the bias is a dynamic bias, the dynamic bias being selected from a list or set of bias values or being determined by one or more of:

the IAB node, an IAB-donor central unit, a core network, CN, another UE, and the bias is signaled to the UE.

5. The wireless communication network of claim 4, wherein selecting the dynamic bias from the list or set of bias values or determining the bias is based on one or more of the following:

one or more measurement reports, MRs, from an IAB mobile termination, IAB-MT, of the IAB node, and by combining the MRs with one or more cell selection and/or reselection parameters for an IAB distribution unit, IAB-DU, of the IAB node previously configured by the IAB-donor, a condition of a backhaul network, a signal from the IAB node, like the IAB-DU, indicative of a load of the IAB-DU exceeding a predefined threshold, a configuration update from the IAB node due to a certain situation, the configuration update indicating.

6. The wireless communication network of claim 5, wherein the one or more measurement reports, MRs, are based on a measurement of one or more cells of one or more neighboring cells, using parameters that the UE also uses for selection and/or reselection, the one or more neighboring cells comprising cells of one or more further IAB nodes.

7. The wireless communication network of claim 1, wherein the dynamic bias is to be signaled using system block information, the system block information comprising one or more fields, which indicate the absolute or relative value of the dynamic bias for one or more IAB nodes, and, optionally, any other delta cell selection and/or reselection parameters to be signaled to the UE.

8. The wireless communication network of claim 7, wherein, in case the system block information indicates the dynamic bias for a plurality of IAB nodes, the UE connects to a certain IAB node or to stay connected to a certain IAB node, if over a certain period of time, the certain IAB node is ranked first according to an adopted one or more cell selection and/or reselection parameters, or a relationship between the IAB node and the UE is quasi-static or a change in path-loss is below a certain threshold.

9. The wireless communication network of claim 7, wherein in case the UE is not in a connected state, like the idle state, or during a connection procedure, the UE or the IAB donor decides whether the UE accesses the wireless communication network via the IAB central unit or via the IAB node, the UE may decide to access the wireless communication network via the IAB node in case one or more cell selection and/or reselection parameters associated with the IAB node exceed corresponding cell selection and/or reselection parameters configured with the IAB central unit, and the IAB donor and/or the IAB central unit may decide that the UE accesses the wireless communication network via the IAB node dependent on one or more criteria or features of the UE and/or the IAB node.

10. The wireless communication network of claim 7, wherein, in case the UE is not in a connected state, or the UE is during a connection procedure, the IAB node signals that it is an IAB node, and the UE decides whether to continue the connection procedure or whether to abort the connection procedure.

11. The wireless communication network of claim 1, wherein for connecting to a certain IAB node or for staying connected to a certain IAB node, the UE determines whether a position of the UE is within a certain distance from a position of the certain IAB node, and the position of the certain IAB node may be signaled to the UE by the certain IAB node or by the IAB donor.

12. The wireless communication network of claim 1, wherein, in case the UE is in a connected state with a certain IAB node, the UE is to stays connected to the certain IAB node in case a change of one or more monitored cell handover-related parameters are below a certain threshold, and performs a handover to another IAB node, in case a change of one or more monitored handover-related parameters meets one or more criteria.

13. The wireless communication network of claim 1, wherein the wireless communication network provides a list of some or all IAB nodes, and the wireless communication network provides the list of IAB nodes to a certain UE via an IAB node or via an IAB central unit to which the certain UE is connected, or via a sidelink between the certain UE and a further UE connected to an IAB node or to a base station.

14. The wireless communication network of claim 1, wherein the wireless communication network comprises a plurality of wireless communication networks operated by respective mobile network operators, MNOs.

15. The wireless communication network of claim 1, wherein the IAB node is a mobile IAB node in a vehicle serving a plurality of UEs located in the vehicle, the plurality of UEs being a group of UEs, and a certain signaling for a certain UE in the group comprises a first part individual to the certain UE and a second part common to some or all UEs of the group, the IAB node comprises at least one IAB mobile termination, IAB-MT, to provide a backhaul link, directly or via one or more further IAB nodes, to an IAB donor, and responsive to a certain event, the IAB donor signals the first parts of the certain signaling for the UEs of the group and only one second part of the certain signaling for the UEs of the group.

16. The wireless communication network of claim 1, wherein the IAB node is a mobile IAB node in a vehicle for serving one or more UEs located in the vehicle, the IAB node is inactive, when the vehicle is not active, and when the vehicles activated, the IAB mode connects the network, and, responsive to a grant of the network access, the IAB node advertises network availability to UEs inside the vehicle.

17. A user equipment, UE, for operating in a wireless communication network, wherein the wireless communication network comprises one or more integrated access and backhaul, IAB, donors, and one or more IAB nodes, the IAB node connected, directly or via one or more further IAB nodes, to the IAB donor, wherein the UE is connected via an IAB node to an IAB donor, wherein the UE monitors one or more cell selection or reselection parameters associated with the IAB node, and wherein, for connecting to the IAB node or for staying connected to the IAB node, the UE adds a bias to the cell selection or reselection parameter associated with the IAB node.

18. A method for operating a wireless communication network, the method comprising:

providing one or more integrated access and backhaul, IAB, donors, one or more IAB nodes and one or more user equipments, UEs, and connecting the IAB node, directly or via one or more further IAB nodes, to the IAB donor, wherein a UE is connected via an IAB node to an IAB donor, wherein the UE monitors one or more cell selection or reselection parameters associated with the IAB node, and wherein, for connecting to the IAB node or for staying connected to the IAB node, the UE adds a bias to the cell selection or reselection parameter associated with the IAB node.

* * * * *